US012702530B2

(12) United States Patent
Park et al.

(10) Patent No.: US 12,702,530 B2
(45) Date of Patent: Aug. 11, 2026

(54) WIRELESS SCANNING SYSTEM AND METHOD FOR PARING WIRELESS SCANNING SYSTEM

(71) Applicant: MEDIT CORP., Seoul (KR)

(72) Inventors: Jung Hwan Park, Seoul (KR); Young Moon Kim, Seoul (KR)

(73) Assignee: MEDIT CORP., Seoul (KR)

( * ) Notice: Subject to any disclaimer, the term of this patent is extended or adjusted under 35 U.S.C. 154(b) by 219 days.

(21) Appl. No.: 18/436,282

(22) Filed: Feb. 8, 2024

(65) Prior Publication Data

US 2024/0207021 A1 Jun. 27, 2024

Related U.S. Application Data

(63) Continuation of application No. PCT/KR2022/011782, filed on Aug. 8, 2022.

(30) Foreign Application Priority Data

Aug. 10, 2021 (KR) ........................ 10-2021-0105025
Aug. 3, 2022 (KR) ........................ 10-2022-0096947

(51) Int. Cl.
*A61C 9/00* (2006.01)

(52) U.S. Cl.
CPC .................................. *A61C 9/0053* (2013.01)

(58) Field of Classification Search
None
See application file for complete search history.

(56) References Cited

U.S. PATENT DOCUMENTS

2014/0061306 A1* 3/2014 Wu .................... G06K 7/10386 235/439
2020/0382756 A1 12/2020 Page et al.
2021/0196152 A1* 7/2021 Saphier .............. A61B 1/00006

FOREIGN PATENT DOCUMENTS

| | | | |
|---|---|---|---|
| JP | 6395445 | B2 | 9/2018 |
| KR | 10-1683766 | B1 | 12/2016 |
| KR | 10-2018-0068297 | A | 6/2018 |
| KR | 10-2019-0141475 | A | 12/2019 |
| KR | 10-2022-0096947 | A | 7/2022 |
| WO | 2020-232223 | A1 | 11/2020 |

OTHER PUBLICATIONS

International Search Report mailed Nov. 18, 2022 for International Application No. PCT/KR2022/011782 and its English translation.

* cited by examiner

*Primary Examiner* — Kristy A Haupt

(57) ABSTRACT

A wireless scanning system according to a disclosed embodiment of the present invention comprises a three-dimensional scanner that acquires at least one piece of image data by scanning an object, and is interconnected with an external electronic apparatus by forming pairing with a communication hub, wherein the three-dimensional scanner comprises: a scanner-side processor that performs at least one control; and a scanner-side communication unit including a scanner-side first communication module that performs pairing in a first frequency band, and a scanner-side second communication module that performs paring in a second frequency band different from the first frequency band.

19 Claims, 18 Drawing Sheets

Figure 6:
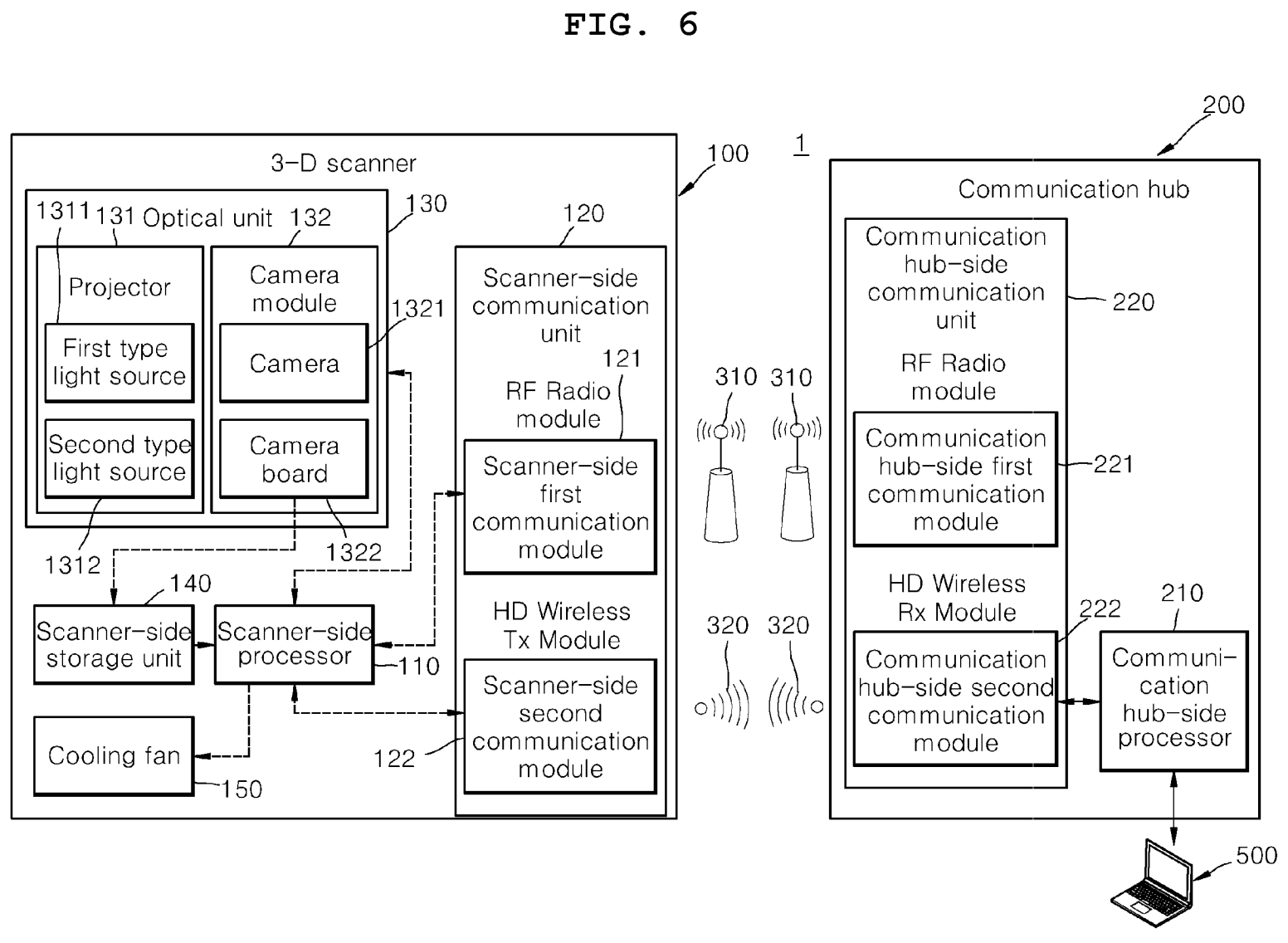

200
Communication hub
220
Communication hub-side communication unit
RF Radio module
221
Communication hub-side first communication module
HD Wireless Rx Module
222
Communication hub-side second communication module
210
Communication hub-side processor
500

310
310
320
320

100
3-D scanner
120
Scanner-side communication unit
RF Radio module
121
Scanner-side first communication module
HD Wireless Tx Module
Scanner-side second communication module
122
130
Optical unit
131
Projector
1311
First type light source
1312
Second type light source
132
Camera module
1321
Camera
1322
Camera board
110
Scanner-side processor
140
Scanner-side storage unit
150
Cooling fan

FIG. 7

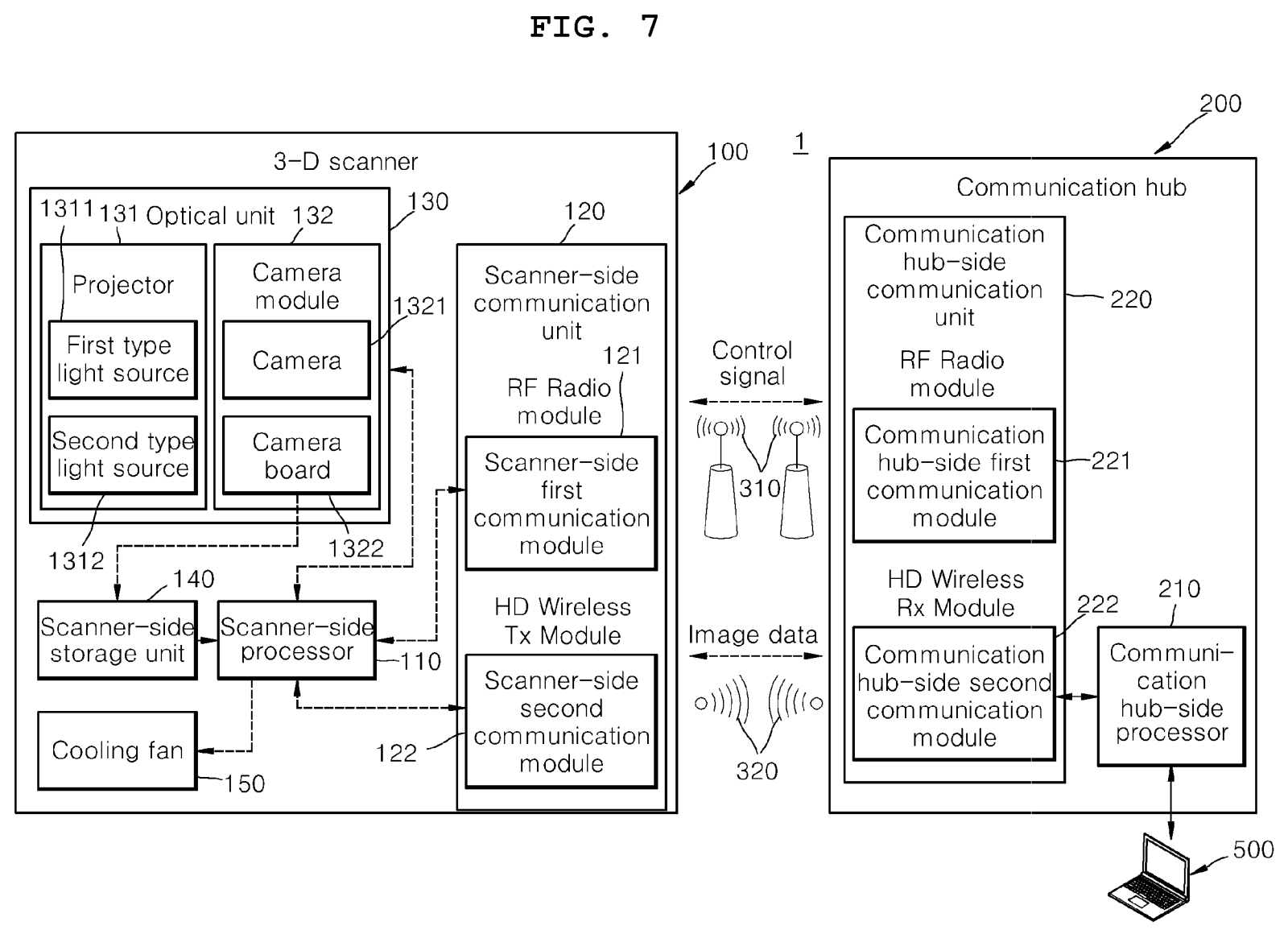

1
100
3-D scanner
130
131 Optical unit
1311
Projector
First type light source
Second type light source
1312
132
Camera module
1321
Camera
Camera board
1322
140
Scanner-side storage unit
Scanner-side processor
110
Cooling fan
150
120
Scanner-side communication unit
121
RF Radio module
Scanner-side first communication module
HD Wireless Tx Module
Scanner-side second communication module
122
Control signal
310
Image data
320
200
Communication hub
Communication hub-side communication unit
220
RF Radio module
Communication hub-side first communication module
221
HD Wireless Rx Module
222
Communication hub-side second communication module
210
Communi-cation hub-side processor
500

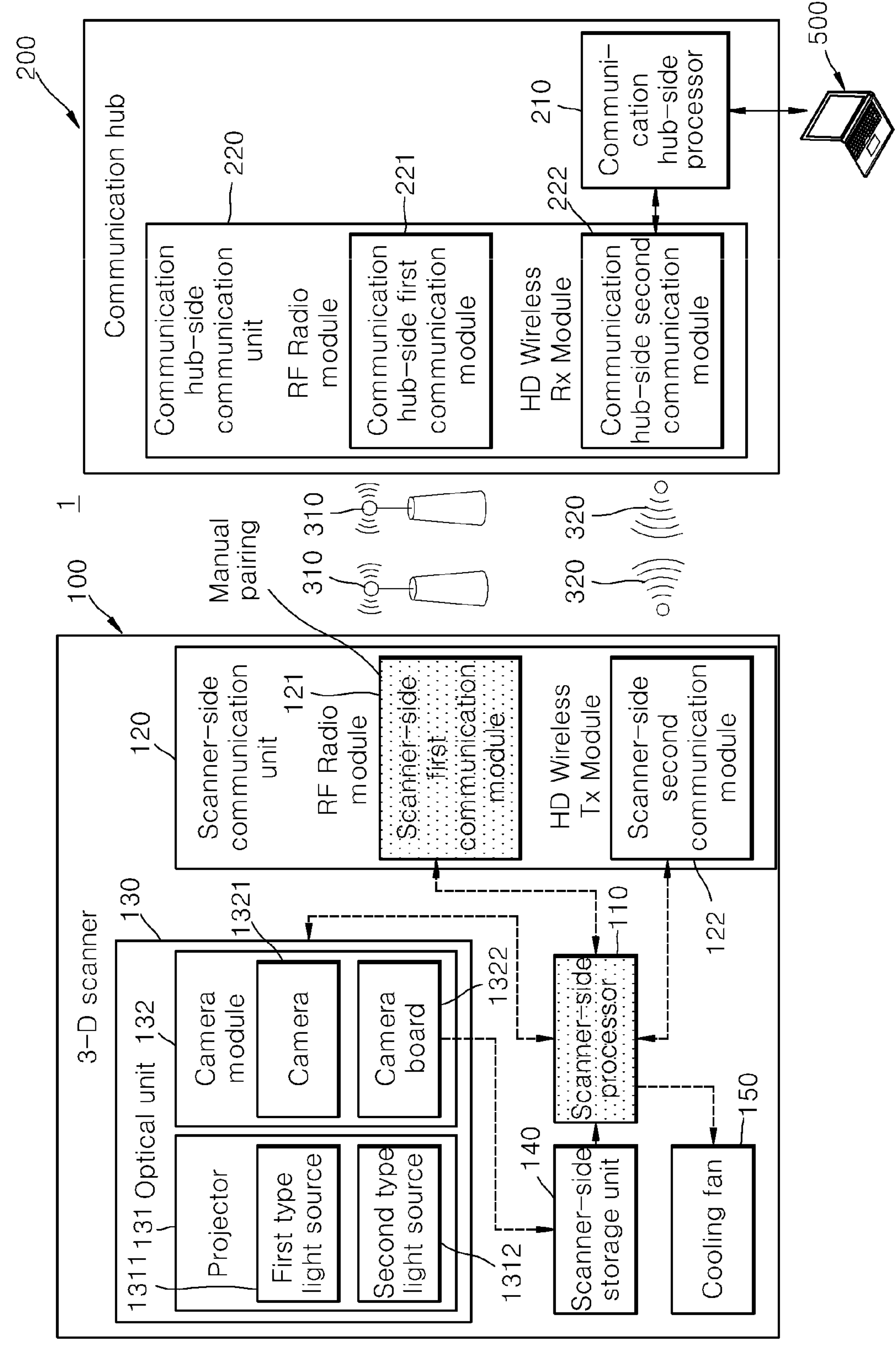
FIG. 9
1
100
3-D scanner
130
131 Optical unit
1311
Projector
First type light source
Second type light source
1312
132
Camera module
1321
Camera
Camera board
1322
110
Scanner-side processor
140
Scanner-side storage unit
150
Cooling fan
120
Scanner-side communication unit
RF Radio module
121
Scanner-side first communication module
HD Wireless Tx Module
Scanner-side second communication module
122
Manual pairing
310
310
320
320
200
Communication hub
220
Communication hub-side communication unit
RF Radio module
221
Communication hub-side first communication module
HD Wireless Rx Module
222
Communication hub-side second communication module
210
Communi-cation hub-side processor
500

Figure 10:
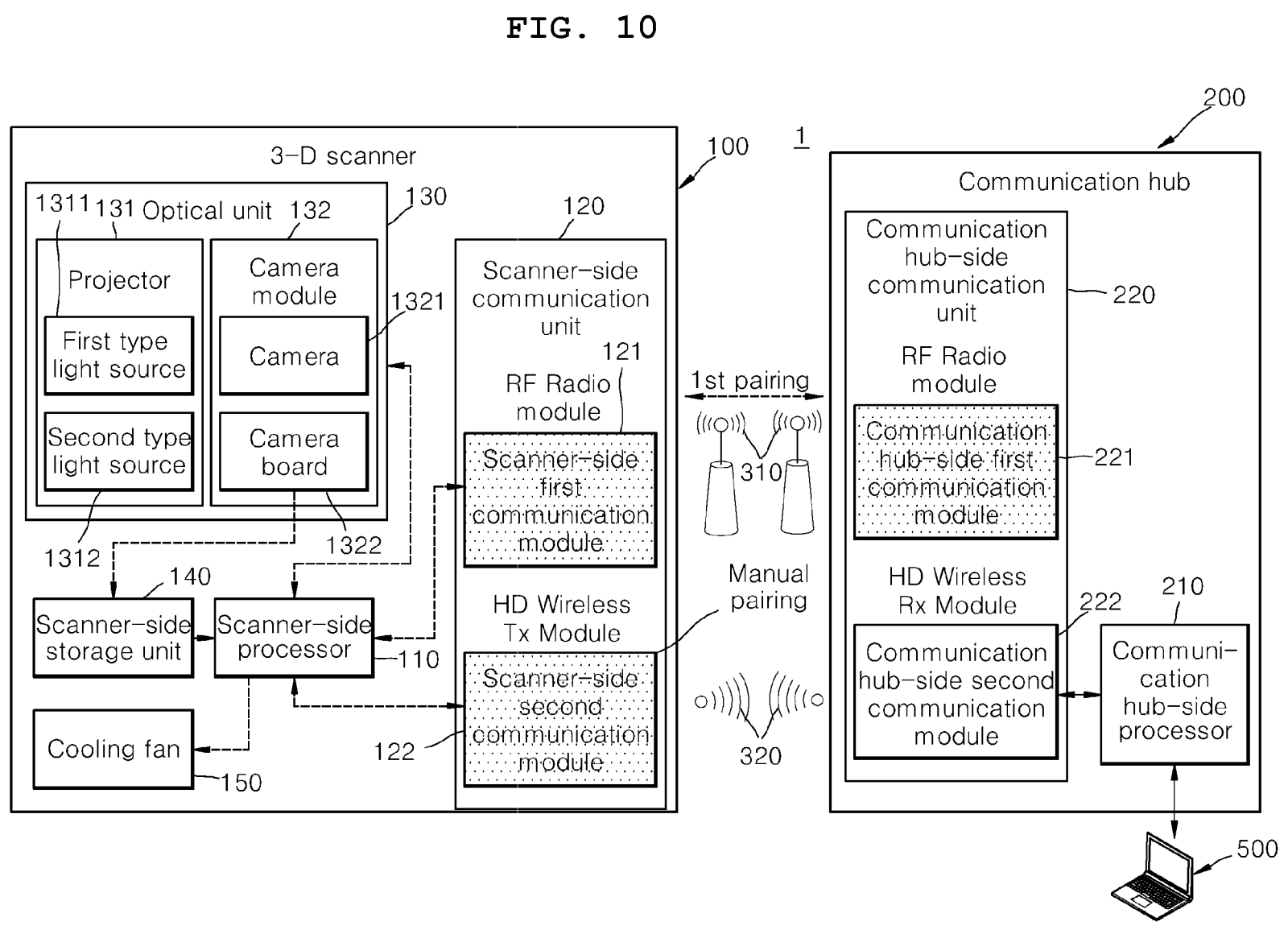

3-D scanner

130 Optical unit

131 Projector

1311 First type light source

1312 Second type light source

132 Camera module

1321 Camera

1322 Camera board

110 Scanner-side processor

140 Scanner-side storage unit

150 Cooling fan

120 Scanner-side communication unit

RF Radio module

121 Scanner-side first communication module

HD Wireless Tx Module

122 Scanner-side second communication module

1st pairing

310

Manual pairing

320

200

Communication hub

220 Communication hub-side communication unit

RF Radio module

221 Communication hub-side first communication module

HD Wireless Rx Module

222 Communication hub-side second communication module

210 Communication hub-side processor

Figure 11:
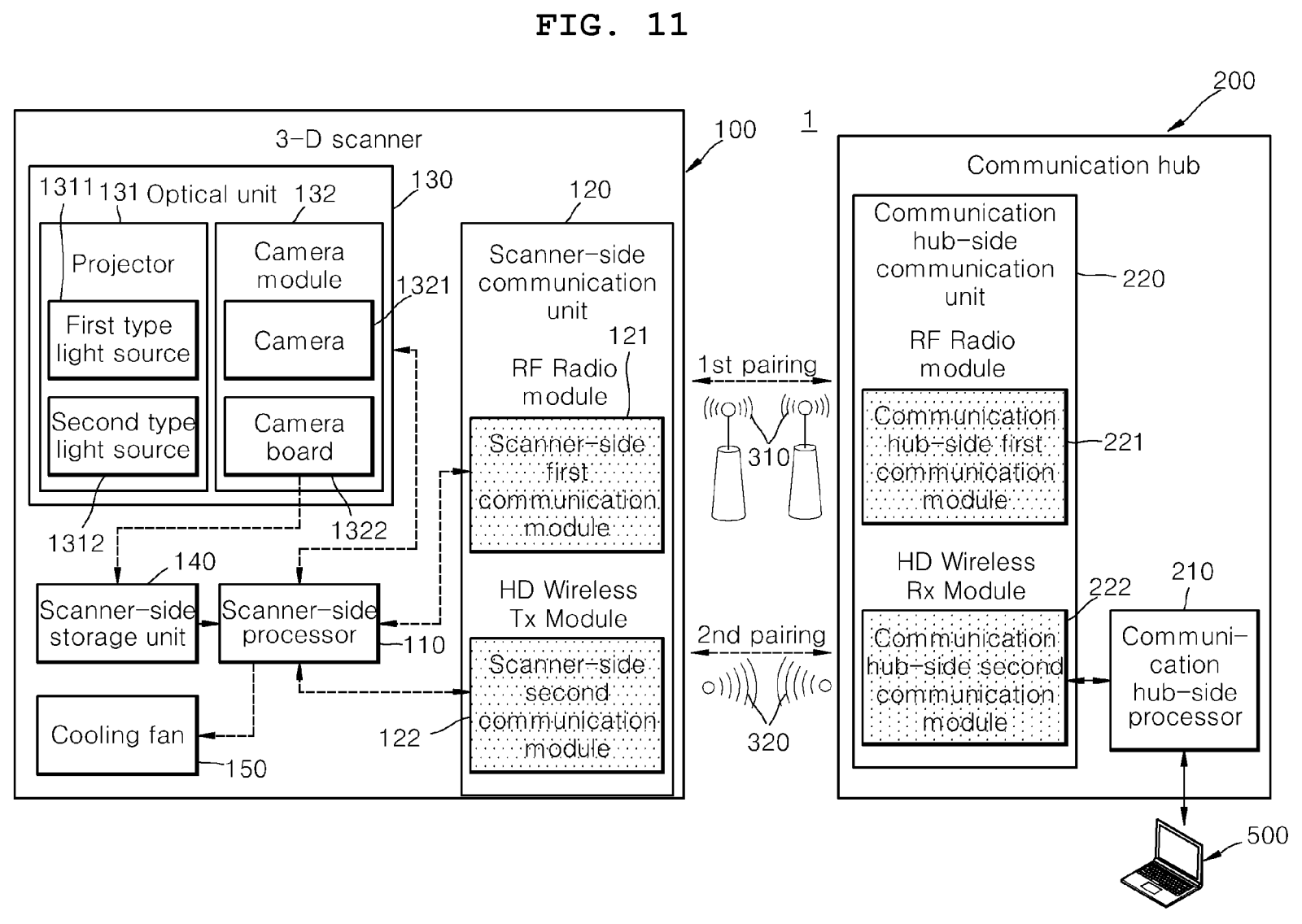

3-D scanner 100

130 Optical unit

131 Projector

1311 First type light source

1312 Second type light source

132 Camera module

1321 Camera

1322 Camera board

110 Scanner-side processor

140 Scanner-side storage unit

150 Cooling fan

120 Scanner-side communication unit

RF Radio module

121 Scanner-side first communication module

HD Wireless Tx Module

122 Scanner-side second communication module

1st pairing

310

2nd pairing

320

Communication hub 200

220 Communication hub-side communication unit

RF Radio module

221 Communication hub-side first communication module

HD Wireless Rx Module

222 Communication hub-side second communication module

210 Communication hub-side processor

500

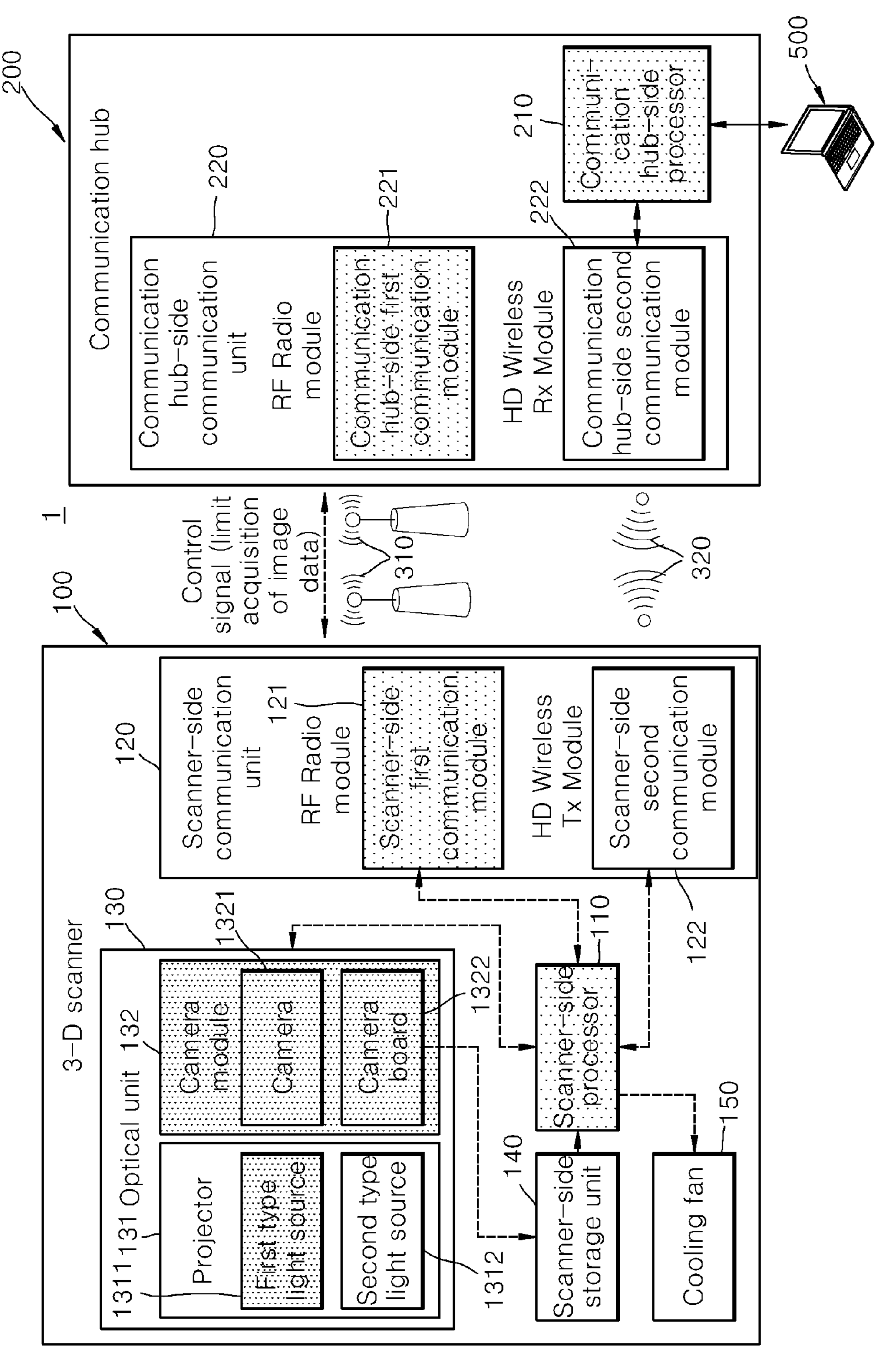
FIG. 13
1
100
3-D scanner
130
131 Optical unit
132
Projector
1311
First type light source
Second type light source
1312
Camera module
1321
Camera
Camera board
1322
110
Scanner-side processor
140
Scanner-side storage unit
150
Cooling fan
120
Scanner-side communication unit
121
RF Radio module
Scanner-side first communication module
HD Wireless Tx Module
Scanner-side second communication module
122
Control signal (limit acquisition of image data)
310
320
200
Communication hub
220
Communication hub-side communication unit
RF Radio module
221
Communication hub-side first communication module
HD Wireless Rx Module
222
Communication hub-side second communication module
210
Communication hub-side processor
500

WIRELESS SCANNING SYSTEM AND METHOD FOR PARING WIRELESS SCANNING SYSTEM

CROSS-REFERENCE TO RELATED APPLICATIONS

This application is a continuation application of International Application No. PCT/KR2022/011782, filed on Aug. 8, 2022, which claims the benefit of Korean Patent Application Nos. 10-2021-0105025, filed on Aug. 10, 2021, and 10-2022-0096947, filed on Aug. 3, 2022, in the Korean Intellectual Property Office, the disclosures of which are incorporated herein in their entirety by reference.

TECHNICAL FIELD

The present disclosure relates to a wireless scanning system and a pairing method for the wireless scanning system. Specifically, the present disclosure relates to a wireless scanning system in which a three-dimensional (3-D) scanner and a communication hub form pairing by using at least two frequency bands and transmit and receive control signals and image data and a pairing method for the wireless scanning system.

BACKGROUND ART

Dental treatment for a patient includes various fields. For the dental treatment of a patient, it is important to accurately check the mouth state of the patient. In order to accurate check the mouth of the patient, a dental computer-aided design/computer-aided manufacturing (CAD/CAM) technology is widely used.

Specifically, the most important thing in dental treatment using CAD/CAM is to obtain elaborate 3-D data for an inside or outside shape of the mouth of a patient, such as the teeth, gums, and jawbones of the patient.

In order to obtain the 3-D data of the mouth, a user may use an optical 3-D scanner (e.g., a handheld type intraoral scanner). The 3-D scanner may obtain the image data of the mouth by using light that is reflected by an object. The image data obtained by the 3-D scanner may be transmitted to an external electronic device. In this case, the external electronic device may be a computing device that processes the image data obtained by the 3-D scanner in order to obtain the 3-D data of the mouth, and may be called a mouth diagnostic device.

The external electronic device can obtain accurate 3-D data of the mouth only when rapidly receiving the image data obtained by the 3-D scanner without omission.

The 3-D scanner tends to be wirelessly developed in order to maximize the usability and portability of a user. A wireless 3-D scanner may communicate with an external electronic device by using wireless communication. However, in order for the external electronic device to receive a large amount of image data rapidly and accurately as in the aforementioned contents, the 3-D scanner and the external electronic device need to mutually stably communicate with each other.

Accordingly, it is necessary to provide a system and method for smooth communication between the 3-D scanner and the external electronic device.

DISCLOSURE

Technical Problem

In order to achieve an object of the present disclosure, a disclosed embodiment of the present disclosure provides a wireless scanning system and a pairing method for the wireless scanning system, which enable the stable and smooth transmission and reception of control signals and image data between a 3-D scanner and an external electronic device by performing pairing in at least two different frequency bands through control over a scanner-side communication unit in a manual pairing state.

Furthermore, a disclosed embodiment of the present disclosure provides a wireless scanning system and a pairing method for the wireless scanning system, which prevent the unnecessary acquisition of image data or the unstable transmission of image data by the 3-D scanner by limiting a specific operation of the 3-D scanner based on the state in which the 3-D scanner and the communication hub have been paired.

Furthermore, a disclosed embodiment of the present disclosure provides a wireless scanning system and a pairing method for the wireless scanning system, which minimize a data loss according to an unnecessary data acquisition process or transmission process by limiting some operation of the 3-D scanner when pairing using any one of two frequency bands fails.

Objects of the present disclosure are not limited to the aforementioned object, and the other objects not described above may be evidently understood from the following description by those skilled in the art.

Technical Solution

In order to achieve the aforementioned objects, a wireless scanning system according to the present disclosure includes a three-dimensional (3-D) scanner configured to obtain at least one image data by scanning an object and mutually connected to an external electronic device by forming pairing with a communication hub. The 3-D scanner includes a scanner-side processor configured to perform at least one piece of control and a scanner-side communication unit including a scanner-side first communication module configured to perform pairing in a first frequency band and a scanner-side second communication module configured to perform pairing in a second frequency band different from the first frequency band.

Furthermore, the scanner-side processor may control at least one of the scanner-side first communication module and the scanner-side second communication module in a manual pairing state.

Furthermore, the first frequency band may be formed to be lower than the second frequency band, and a communication distance of the first frequency band may be formed to be greater than a communication distance of the second frequency band.

Furthermore, the communication hub may include a communication hub-side communication unit including a communication hub-side first communication module configured to perform communication with the 3-D scanner in the first frequency band and a communication hub-side second communication module configured to perform communication with the 3-D scanner in the second frequency band. The scanner-side processor may control the scanner-side first communication module in a pairing state, so that the scanner-side first communication module filters the communication hub based on at least one piece of filtering information, and the scanner-side first communication module and the communication hub-side first communication module form first pairing.

Furthermore, the scanner-side processor may control the scanner-side second communication module in the pairing state, so that the scanner-side second communication module filters the communication hub based on at least one piece of filtering information, and the scanner-side second communication module and the communication hub-side second communication module form second pairing. The second pairing may be formed after the first pairing.

Furthermore, the 3-D scanner and the communication hub may mutually transmit and receive control signals related to at least one of an acquisition operation and transmission operation of the image data in the first frequency band, and may mutually transmit and receive the image data in the second frequency band.

Furthermore, the 3-D scanner and the communication hub may mutually transmit and receive the control signals bidirectionally. The 3-D scanner may unidirectionally transmit the image data to the communication hub in response to a control signal related to the transmission operation.

Furthermore, when any one of the first pairing and the second pairing fails, the external electronic device may transmit, to the scanner-side processor, a control signal to limit the acquisition operation of the image data by the 3-D scanner through the communication hub.

Furthermore, the 3-D scanner may further include an optical unit including a projector configured to project predetermined light toward the object and a camera module configured to obtain the image data. An operation of at least some of the optical unit may be limited by the control signal to limit the acquisition operation of the image data.

Furthermore, the projector may include a first type light source for obtaining a color and shape of the image data and a second type light source for sterilizing an inside of the 3-D scanner. An operation of the first type light source may be limited by the control signal to limit the acquisition operation of the image data.

Furthermore, when any one of the first pairing and the second pairing fails, the external electronic device may transmit, to the scanner-side processor, a control signal to limit a transmission operation of the image data by the 3-D scanner through the communication hub.

A pairing method for a wireless scanning system according to the present disclosure includes a manual pairing standby step of at least one of a three-dimensional (3-D) scanner and a communication hub switching to a manual pairing state, and a pairing step of the 3-D scanner and the communication hub forming pairing by using at least two frequency bands including a first frequency band and a second frequency band different from the first frequency band.

Furthermore, the manual pairing standby step may be automatically performed when power is supplied to each of the 3-D scanner and the communication hub.

Furthermore, the manual pairing standby step may be performed when power is supplied to each of the 3-D scanner and the communication hub and a predetermined pairing standby signal is applied to at least one of the 3-D scanner and the communication hub.

Furthermore, the pairing method may further include a pairing data check step of checking pairing data of at least one of the 3-D scanner and the communication hub prior to the manual pairing standby step. When the pairing data are present in the pairing data check step, the 3-D scanner and the communication hub corresponding to the pairing data may be automatically paired.

Furthermore, the pairing step may include a first pairing step of at least one of the 3-D scanner and the communication hub forming first pairing between the 3-D scanner and the communication hub through communication in a first frequency band, and a second pairing step of at least one of the 3-D scanner and the communication hub forming second pairing between the 3-D scanner and the communication hub through communication in a second frequency band different from the first frequency band. The second pairing step may be performed after the first pairing is formed.

Furthermore, the first pairing step may include a first filtering step of a scanner-side first communication module that performs communication in the first frequency band filtering the communication hub based on at least one piece of filtering information by a scanner-side processor embedded in the 3-D scanner, and a first pairing forming step of the scanner-side first communication module and a communication hub-side first communication module forming the first pairing.

Furthermore, the second pairing step may include a second filtering step of a scanner-side second communication module that performs communication in the second frequency band filtering the communication hub based on at least one piece of filtering information by the scanner-side processor embedded in the 3-D scanner, and a second pairing forming step of the scanner-side second communication module and a communication hub-side second communication module forming the second pairing.

Furthermore, the first filtering step and the second filtering step may be performed when the 3-D scanner and the communication hub do not have pairing data prior to the manual pairing standby step.

Furthermore, the first frequency band may be formed to be lower than the second frequency band. A communication distance of the first frequency band may be formed to be greater than a communication distance of the second frequency band.

Furthermore, the pairing method may further include a 3-D scanner limit step of the communication hub limiting at least one of an acquisition operation and transmission operation of image data by the 3-D scanner by applying a control signal to the 3-D scanner when any one of the first pairing and the second pairing fails.

Advantageous Effects

There is an advantage in that a large amount of image data can be transmitted safely in real time by using the wireless scanning system and the pairing method for the wireless scanning system according to a disclosed embodiment of the present disclosure.

Furthermore, there is an advantage in that data can be rapidly transmitted because image data can be transmitted over a communication network having a high frequency band although the 3-D scanner generates a 3-D image.

Furthermore, there are advantages in that the 3-D scanner can distinguish between the communication hub and other wireless communication devices through the filtering step and stable pairing can be formed.

Furthermore, there are advantages in that a user can rapidly form pairing with a device that needs to be paired at a desired place and faster pairing is possible because a filtering step is omitted when pairing data are present.

Furthermore, there are advantages in that if robust pairing (dual pairing) has not been formed between the 3-D scanner and the communication hub, a loss of image data that are transmitted from the 3-D scanner to the external electronic device can be prevented and system resources can be reduced by limiting at least one of the acquisition operation of the image data and the transmission operation of the image data.

DESCRIPTION OF DRAWINGS

The present disclosure may be easily understood through the following detailed description and a combination of the accompanying drawings. Reference numerals mean structural elements.

FIG. 6 is a diagram for describing communication between the 3-D scanner and the external electronic device in detail in the wireless scanning system according to the present disclosure.

FIG. 7 is a diagram for describing a process of transmitting and receiving control signals and image data between the 3-D scanner and a communication hub in the wireless scanning system according to the present disclosure.

FIG. 9 is a diagram for describing a process of a scanner-side first communication module of the 3-D scanner being controlled in a manual pairing state in the wireless scanning system according to the present disclosure.

FIG. 10 is a diagram for describing the state in which the scanner-side first communication module of the 3-D scanner has formed first pairing with the communication hub and a process of a scanner-side second communication module being controlled in the manual pairing state in the wireless scanning system according to the present disclosure.

FIG. 11 is a diagram for describing the state in which the scanner-side second communication module of the 3-D scanner has formed second pairing with the communication hub in the wireless scanning system according to the present disclosure.

FIG. 13 is a diagram for describing a process of limiting the acquisition of image data by the 3-D scanner when any one of pieces of forming of first pairing and second pairing between the 3-D scanner and the communication hub fails in the wireless scanning system according to the present disclosure.

DESCRIPTION OF REFERENCE NUMERALS

Figure 1:
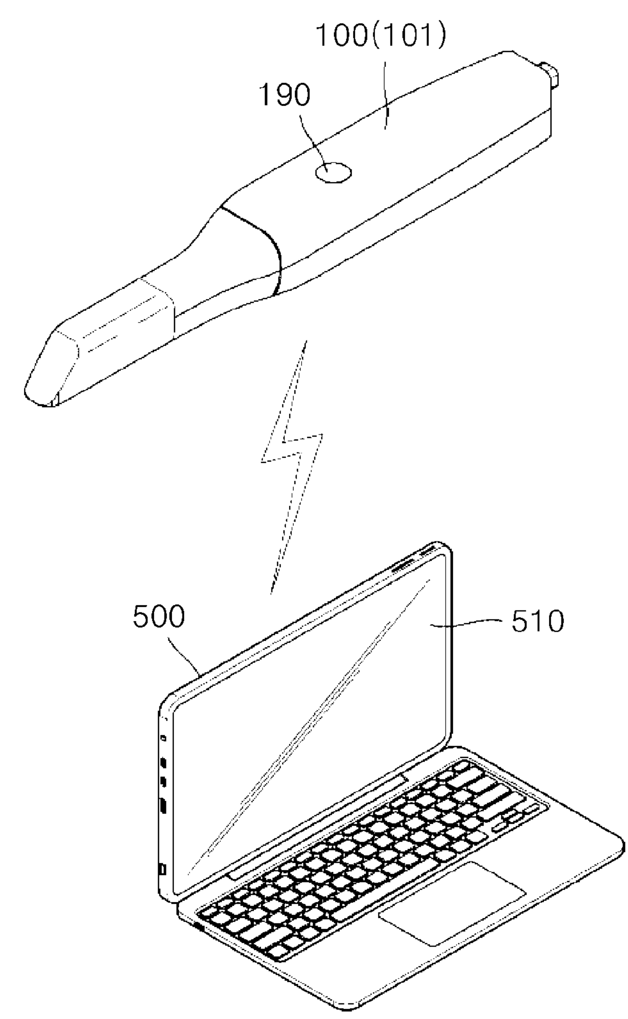
FIG. 1 is a diagram for describing an intraoral scanner, that is, an example of a 3-D scanner, and an external electronic device that communicates with the intraoral scanner.

- 100: 3-D scanner 110: scanner-side processor
- 120: scanner-side communication unit 121: scanner-side first communication module
- 122: scanner-side second communication module 130: optical unit
- 200: communication hub 210: communication hub-side processor
- 220: communication hub-side communication unit 221: communication hub-side first communication module
- 222: communication hub-side second communication module
- 310: first communication network 320: second communication network
- 400: image data 500: external electronic device
- S110: power supply step S120: pairing data check step
- S130: manual pairing standby step S140: pairing step
- S150: 3-D scanner limit step S160: data transmission step

BEST MODE

Hereinafter, some embodiments of the present disclosure will be described in detail with reference to exemplary drawings. In adding reference numerals to the components of each drawing, it should be noted that the same components have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof will be omitted.

Furthermore, in describing components of an embodiment of the present disclosure, terms, such as a first, a second, A, B, (a), and (b), may be used. Such terms used only to distinguish one component from another component, and the essence, order, or sequence of a corresponding component is not limited by the terms. All terms used herein, including technical or scientific terms, have the same meanings as those commonly understood by a person having ordinary knowledge in the art to which an embodiment pertains, unless defined otherwise in the specification. Terms, such as those commonly used and defined in dictionaries, should be construed as having the same meanings as those in the context of a related technology, and are not construed as having ideal or excessively formal meanings unless explicitly defined otherwise in the specification.

A "part" or "portion" that is used this specification may be implemented as software or hardware. A plurality of "parts" or "portions" may be implemented as one unit or element according to an embodiment. One "part or portion" may include a plurality of units or elements.

In order to describe the present disclosure, an expression "configured (or set) to ~" that is used in an embodiment of the present disclosure may be interchangeably used with "suitable for ~", "having the capacity to ~", "designed to ~", "adapted to ~", "made to ~", or "capable of ~", for example, according to circumstance. The term "configured (or set) to ~" may not essentially mean "specifically designed to" in terms of hardware. Instead, in a situation, an expression "system configured to ~" may mean that the system is "capable of ~" along with another device or parts. For example, a phrase "processor configured (or set) to perform A, B, and C" may mean a dedicated processor (e.g., an embedded processor) for performing a corresponding operation or a generic-purpose processor (e.g., a CPU or application processor) capable of performing corresponding operations by executing one or more software programs stored in memory.

In a disclosed embodiment of the present disclosure, a three-dimensional (3-D) scanner means an electronic device which obtains an image related to an object. Specifically, the 3-D scanner denoted in the present disclosure may mean a scanner that is used for the treatment of a mouth and that obtains an image related to the mouth. For example, the 3-D scanner in a disclosed embodiment of the present disclosure may be a handheld type intraoral scanner having a form in which the intraoral scanner can be drawn into an actual mouth of a patient. Alternatively, the 3-D scanner in a disclosed embodiment of the present disclosure may be a table type scanner which may be used in dental treatment.

Hereinafter, all of the handheld type intraoral scanner and the table type scanner having a form in which the handheld type intraoral scanner and the table type scanner can be drawn into the mouth are denoted as "3-D scanners", for convenience of description.

In a disclosed embodiment of the present disclosure, an image may mean an image (e.g., an "oral image") indicative of an object that is included in the mouth. In this case, the object may include teeth, gums, at least some areas of the mouth and/or an artificial structure (e.g., an orthodontic device including a bracket and a wire, implants, artificial teeth, dental restoration including inlay and onlay, and an orthodontic assistant tool inserted into the mouth) which may be inserted into the mouth. Alternatively, the object may include an artifact related to the mouth, for example, a plaster model or a crown. Furthermore, the orthodontic device may include at least one of a bracket, an attachment, a screw for orthodontics, a lingual orthodontic device, and a flexible correction holding device.

Furthermore, in a disclosed embodiment of the present disclosure, an image may be a two-dimensional (2-D) image of an object or a 3-D model or 3-D image that stereoscopically indicates an object.

Furthermore, in a disclosed embodiment of the present disclosure, an image may mean data that is necessary to represent an object in a 2-D or 3-D way, for example, raw data or a raw image that is obtained from one or more cameras. Specifically, the raw image is data that are obtained in order to generate an oral image necessary for diagnosis, and may be an image (e.g., a 2-D frame image) that is obtained by one or more cameras included in a 3-D scanner when the inside of the mouth of a patient, that is, an object, is scanned by using the 3-D scanner. Furthermore, the raw image is an image that has not been processed, and may mean the original of an image that is obtained by the intraoral scanner.

Hereinafter, embodiments of the present disclosure are described in detail with reference to the drawings.

FIG. 1 is a diagram for describing an intraoral scanner 101, that is, an example of a 3-D scanner 100, and an external electronic device 500 that communicates with the intraoral scanner. Referring to FIG. 1, a wireless scanning system 1 according to the present disclosure includes the 3-D scanner 100. The 3-D scanner 100 obtains at least one image data by scanning an object, and is mutually connected to the external electronic device in communication by forming pairing with a communication hub (not illustrated) described later.

More specifically, the 3-D scanner 100 is a medical device for obtaining an image within the mouth. Like the intraoral scanner 101 illustrated in FIG. 1, the 3-D scanner 100 having a form in which the 3-D scanner can be drawn into the mouth may be denoted as a handheld type intraoral scanner, a portable scanner, etc.

More specifically, the intraoral scanner 101 of the 3-D scanner 100 may be a device for generating a 3-D model of the mouth including at least one tooth by being inserted into the mouth and contactlessly scanning teeth. Furthermore, the intraoral scanner 101, that is, a kind of 3-D scanner 100, may have a form in which the intraoral scanner can be drawn into and drawn out from the mouth, and may scan the inside of the mouth of a patient by using one or more cameras (e.g., optical cameras). The 3-D scanner 100 may obtain surface information of an object as raw data in order to image a surface of at least one of teeth or gums within the mouth, that an object, an artificial structure (e.g., an orthodontic device including a bracket and a wire, implants, an artificial teeth, or an orthodontic assistant tool that is inserted into the mouth) which may be inserted into the mouth, and a plaster model.

In this case, the raw data that are obtained by the 3-D scanner 100 may be at least one image that is obtained by one or more cameras included in the 3-D scanner 100. Specifically, the raw data may be at least one 2-D frame image that is obtained through the scan of the mouth by the 3-D scanner 100. In this case, the "frame image" may also be called a "frame" or "frame data".

The raw data obtained by the 3-D scanner 100 may be transmitted to the external electronic device 500 that is connected over a communication network.

Furthermore, the 3-D scanner 100 may obtain a 3-D model or 3-D image that is generated based on raw data that are obtained by one or more cameras. Furthermore, the obtained 3-D model or 3-D image may be transmitted to the external electronic device 500.

The external electronic device 500 is connected to the 3-D scanner 100 over a communication network, and may receive data (e.g., image data) that are obtained by scanning an object from the 3-D scanner 100. The external electronic device 500 may be all electronic devices capable of generating, processing, displaying and/or transmitting an oral image based on data that are transmitted by the 3-D scanner 100.

More specifically, the external electronic device 500 may generate at least one of information that is necessary for the diagnosis of the mouth and an image indicative of the mouth based on data that are received from the 3-D scanner 100, and may display the generated information and image through a display unit 510.

Illustratively, the external electronic device 500 may be all electronic devices capable of generating, processing, displaying and/or transmitting 3-D data or a 3-D image of an object based on image data received from the intraoral scanner 101.

Illustratively, the external electronic device 500 may be a computing device, such as a smartphone, a laptop computer, a desktop computer, a PDA, or a tablet PC, but is not limited to the listed examples.

Furthermore, the external electronic device 500 may be present in the form of a server (or a server device), etc. for processing an image (e.g., an oral image) of an object.

Furthermore, the external electronic device 500 may store execute dedicated software that operates in conjunction with the intraoral scanner 101. In this case, the dedicated software may be called a dedicated program or a dedicated application. If the external electronic device 500 mutually operates in conjunction with the intraoral scanner 101, the dedicated software stored in the external electronic device 500 may be connected to the intraoral scanner 101, and may receive data that are obtained through the scan of an object in real time. Illustratively, dedicated software for processing data may be present for each product of the intraoral scanner 101. The dedicated software may perform at least one operation for obtaining, processing, storing and/or transmitting a 3-D image of an object.

Furthermore, the 3-D scanner 100 may transmit raw data that are obtained through the scan of an object to the external electronic device 500 without any change. In response thereto, the external electronic device 500 may generate a 3-D image of the object, which indicates the object in a 3-D way based on the received raw data. Furthermore, the external electronic device 500 may generate a "3-D oral image" by modeling an internal structure of the mouth in a 3-D way based on the received raw data. The generated data may be denoted as a "3-D oral model".

Hereinafter, an example in which the 3-D scanner 100, that is, one component of the wireless scanning system 1 according to a disclosed embodiment of the present disclosure, is formed as a table scanner 102 which may be disposed in a table, etc., not a form in which the 3-D scanner is drawn into the mouth, is described with reference to FIG. 2.

Figure 2:
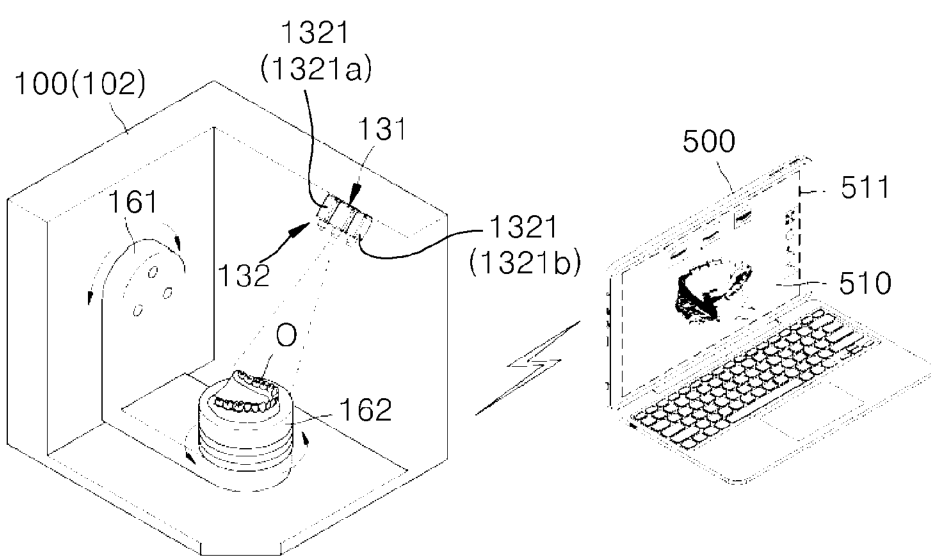
FIG. 2 is a diagram for describing a table scanner, that is, another example of the 3-D scanner, and an external electronic device that communicates with the table scanner.

FIG. 2 is a diagram for describing the table scanner 102, that is, another example of the 3-D scanner 100, and the external electronic device 500 that communicates with the table scanner. In components illustrated in FIG. 2, the same components as those in FIG. 1 have been illustrated by using the same reference numerals.

Referring to FIG. 2, the 3-D scanner 100 according to a disclosed embodiment of the present disclosure is a scanner that is used for the treatment of the mouth and that obtains an image related to the mouth as described above, and may be the table scanner 102.

The 3-D scanner 100 may obtain 3-D data indicative of a shape of an object by using the principle of triangular measurement based on a deformation of a pattern by projecting light onto an object and scanning the object onto which the light has been projected. A method of obtaining 3-D data is not limited thereto, and various known scan methods may be applied.

Referring to FIG. 2, the table scanner 102, that is, a kind of 3-D scanner 100, may include a projector 131, one or more cameras 1321*a* and 1321*b*, an arm 161, and a turn table 162.

The 3-D scanner 100 may obtain raw data by scanning an object O. In an embodiment, the 3-D scanner 100 may project light onto the object O that is disposed on the turn table 162 through the projector 131. The light that is output from the projector 131 may have various forms, such as a line or dot form, a structured light form, and a stripe pattern.

Furthermore, the light that is output from the projector 131 may generate light the pattern of which is autonomously changed. Illustratively, the projector 131 may be a device that outputs light through a light source. Alternatively, the projector 131 may output light having predetermined intensity. The light may be deformed into light having a predetermined pattern while passing through a pattern generation device (not illustrated), such as a pattern mask or a digital micromirror device (DMD).

The 3-D scanner 100 may obtain image data relating to the object O by scanning a surface of the object O onto which light has been projected by using the one or more cameras (e.g., optical cameras) 1321*a* and 1321*b*. In this case, the "image data" may mean a plurality of 2-D images that are obtained by scanning the surface of the object O by using the one or more cameras 1321*a* and 1321*b* in order to generate 3-D data of the object O. In this case, the image data may be raw data. Alternatively, the image data that are obtained by the 3-D scanner 100 may be a 3-D image that represents the object O in a 3-D way by using the 2-D images.

The 3-D scanner 100 may include the one or more cameras 1321 as described above. FIG. 2 illustrates a case in which the intraoral scanner 101 includes the two cameras 1321*a* and 1321*b* as an example. However, this is exemplary. In an embodiment of the present disclosure, the 3-D scanner 100 may include one camera 1321 or may include a plurality of cameras 1321 equal to or greater than 3.

In an embodiment according to the present disclosure, the 3-D scanner 100 may obtain image data including a plurality of 2-D image frames by scanning the object by using the plurality of cameras 1321*a* and 1321*b*. For example, the 3-D scanner 100 may project light onto the object O through the projector 131. The 3-D scanner 100 may obtain a plurality of 2-D images by scanning the object O onto which the light has been projected through the plurality of cameras 1321*a* and 1321*b*.

In the table scanner 102 that is a kind of 3-D scanner 100, the turn table 162 may be connected to the housing of the table scanner 102 through the arm 161. The turn table 162 may have its location moved or rotated along a preset moving path. Illustratively, the turn table 162 may swing in an axial direction by control of the arm 161 or may be rotated around a central axis thereof at a preset angle. As another example, the turn table 162 may be moved or rotated once for a unit movement time, and may be then stopped for a preset time.

The 3-D scanner 100 and the external electronic device 500 may be interconnected over a wireless communication network. Illustratively, the 3-D scanner 100 may communicate with the external electronic device 500 over a wireless communication network according to a communication standard, such as Bluetooth, Wi-Fi, Bluetooth low energy (BLE), NFC/RFID, Wi-Fi Direct, UWB, or ZIGBEE.

The 3-D scanner 100 may transmit obtained image data to the external electronic device 500.

As described with reference to FIG. 1, the external electronic device 500 may store and execute dedicated software. For example, the dedicated software may be stored in processor (not illustrated) or memory (not illustrated) of the external electronic device 500. Furthermore, the dedicated software may provide a user interface (not illustrated) for the use of data that are obtained by the 3-D scanner 100. A user interface screen 511 that is provided by the dedicated software may include a 3-D image of the object O, which is generated according to a disclosed embodiment of the present disclosure.

As described with reference to FIGS. 1 and 2, in a disclosed embodiment of the present disclosure, the 3-D scanner 100 may perform a scan on the object O by using an optical triangulation method, a confocal method, etc.

More specifically, the 3-D scanner 100 may obtain several tens to several thousands of images per second, and may transmit the obtained images to the external electronic device 500 in real time. In this case, in order for the external electronic device 500 to generate a 3-D model of the mouth in real time by using the images obtained by the 3-D scanner 100, the 3-D scanner 100 needs to rapidly transmit the plurality of obtained images to the external electronic device 500 in real time without time delay.

However, in order to rapidly transmit the plurality of images obtained by the 3-D scanner 100 to the external electronic device 500 without a data loss, the 3-D scanner 100 and the external electronic device 500 need to be stably connected communicatively. Accordingly, the 3-D scanner 100 and the external electronic device 500 need to be mutually paired and should not be subjected to interference from a signal of another device.

Hereinafter, a detailed construction and operation of the wireless scanning system and a pairing method for the wireless scanning system according to a disclosed embodiment of the present disclosure are described in detail with reference to the accompanying drawings.

Furthermore, in drawings described hereinafter, the 3-D scanner 100 has been illustrated as the intraoral scanner 101 having a form in which the intraoral scanner can be drawn into the mouth as illustrated in FIG. 1, but the 3-D scanner 100 is not limited to the intraoral scanner 101, and may be the table scanner 102.

Figure 3:
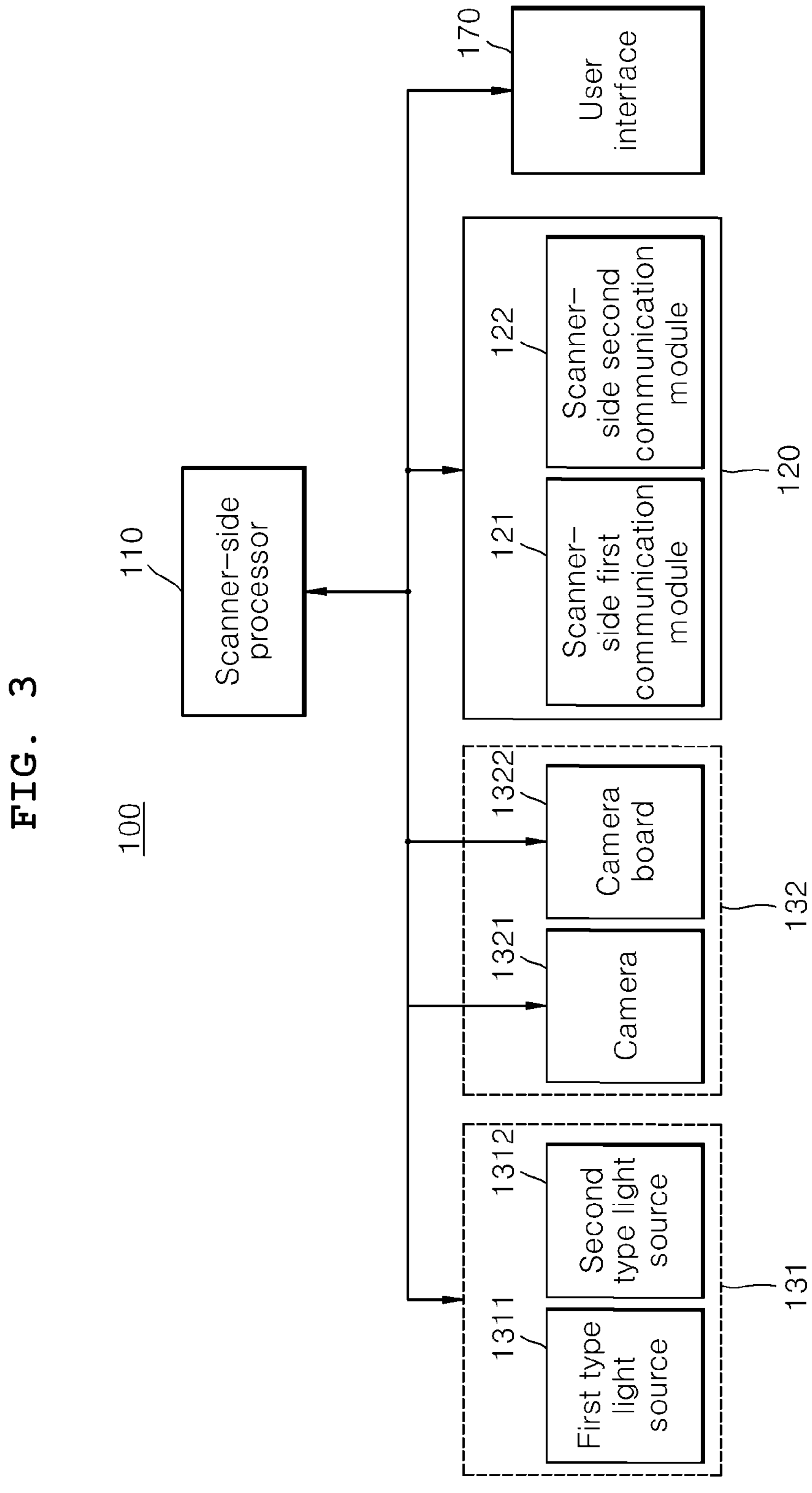
FIG. 3 is a block diagram illustrating a 3-D scanner, that is, one component of a wireless scanning system according to the present disclosure.

FIG. 3 is a block diagram illustrating the 3-D scanner 100, that is, one component of the wireless scanning system 1 according to the present disclosure.

The 3-D scanner 100, that is, one component of the wireless scanning system 1 according to a disclosed embodiment of the present disclosure, corresponds to the intraoral scanner 100, 101, or 102 described with reference to FIGS. 1 and 2, and thus a description thereof that is redundant with that in FIGS. 1 and 2 is omitted.

Referring to FIG. 3, the 3-D scanner 100 includes a processor 110, a scanner-side communication unit 120, and a camera module 132. According to circumstances, the 3-D scanner 100 may further include a projector 131 that outputs light to be imaged along with the object. The projector 131 may correspond to a projector 131 to be described later in FIGS. 4 and 6.

The camera module 132 includes one or more cameras 1321. The camera module 132 may obtain at least one image by performing photographing on the mouth. More specifically, the camera module 132 includes the one or more cameras 1321, and may generate image data to be transmitted to an external electronic device (not illustrated) (e.g., corresponding to 500 in FIG. 1) by performing photographing on the mouth.

In this case, the image data that are generated by the camera module 132 may be at least one image that is obtained by the one or more cameras.

Alternatively, the camera module 132 may generate image data corresponding to at least one image that is obtained by the one or more cameras 1321. Alternatively, the camera module 132 may generate image data by changing a form of at least one image that is obtained by the one or more cameras 1321. Alternatively, the image data that are obtained by the camera module 132 may be a 3-D image or 3-D model that indicates the object in a 3-D way on the basis of a plurality of images that are obtained by the one or more cameras. Hereinafter, the "one or more cameras 1321" may be called the "camera 1321", for convenience of description. That is, the camera 1321 may denote one camera or may denote a plurality of cameras.

The camera 1321 may include at least one image sensor (not illustrated). Specifically, each of the one or more cameras included in the camera 1321 may include a lens (not illustrated) and an image sensor (not illustrated). In this case, the image sensor (not illustrated) may be a device that shows light incident on the lens (not illustrated) in the form of an image by converting the light into an electrical signal in order to obtain the image. For example, the image sensor may be at least one of known image sensors, such as a CCD sensor, a CMOS sensor, and a color image sensor, and is not essentially limited to the listed examples.

The camera 1321 may obtain several hundreds of images per second according to a set frame per second (FPS). In this case, the image that is obtained by the camera 1321 may be a 2-D frame image. The FPS indicates the number of frame images that are obtained per second, and may be called a "frame rate".

Illustratively, when an operation frame per second (FPS) of the camera 1321 is 100 FPS, the camera 1321 may obtain 100 object images per second. For example, if the camera 1321 of the 3-D scanner 100 includes an R camera (right camera) and a L camera (left camera) that are two cameras, 100 images per second are obtained by the R camera, and 100 images per second are obtained by the L camera. Furthermore, the R camera and the L camera operate in synchronization with each other. The R camera and the L camera may obtain an R image and an L image, respectively, at each same time point.

As another example, if the camera 1321 of the 3-D scanner 100 includes one camera, 100 images per second may be obtained.

As still another example, if the 3-D scanner 100 performs an image scan by using the confocal method, each of the one or more cameras included in the camera 1321 may include a lens (not illustrated) that is formed to be movable by adjusting the location of a focus and an image sensor (not illustrated) that obtains an image based on light that passes through the lens (not illustrated).

Meanwhile, the camera module 132 of the 3-D scanner 100 may include a camera board 1322 that obtains image data corresponding to at least one image in addition to the one or more cameras 1321 that obtains the at least one image.

Furthermore, the camera board 1322 may control the camera 1321 for an image scan. Illustratively, the camera board 1322 may set a region of interest (ROI), exposure time and/or frame rate of the camera 1321.

Alternatively, the camera board 1322 may generate image data corresponding to at least one image that is obtained by the camera 1321. For example, the camera board 1322 may generate image data corresponding to at least one image by converting the format of the at least one image that is obtained by the camera 1321.

Alternatively, the camera board 1322 may generate image data corresponding to a plurality of images by encoding at least one image that is obtained by the camera 1321.

Furthermore, if the camera module 132 does not include the camera board 1322, at least one of the aforementioned operations that are performed by the camera board 1322 may be performed by the scanner-side processor 110 described later.

The scanner-side communication unit 120 may perform wireless communication with the external electronic device (not illustrated in FIG. 3) (e.g., 500 in FIG. 1) through a plurality of communication channels. In this case, the communication channel may mean a communication network over which wireless signals are transmitted and received through a predetermined frequency band. Specifically, the communication channel may be a communication network over which wireless signals having a frequency band that is defined according to a predetermined wireless communication standard are transmitted and received. In this case, the wireless communication standard may be a communication standard, such as wireless Gigabit (WiGig), Bluetooth, Wi-Fi, Bluetooth low energy (BLE), NFC/RFID, Wi-Fi direct, UWB, or ZIGBEE. Furthermore, a communication network according to a predetermined frequency band or a predetermined communication standard may be called a communication channel.

More specifically, the scanner-side communication unit 120 includes a scanner-side first communication module 121 that performs pairing in a first frequency band and a scanner-side second communication module 122 that performs pairing in a second frequency band.

Furthermore, the scanner-side communication unit 120 may perform wired communication with the external electronic device (not illustrated). However, in a disclosed embodiment of the present disclosure, a case in which the scanner-side communication unit 120 performs wireless communication with the external electronic device (not illustrated) is illustrated and described as an example.

The scanner-side processor 110 may perform an operation targeted by the scanner-side processor 110 by performing at least one piece of control. Specifically, the scanner-side processor 110 may control a photographing (or scanning) operation for the object, an acquisition operation for an image of the object, and/or a transmission operation for data (e.g., image data) corresponding to the obtained image. Furthermore, when it is written that the scanner-side processor 110 performs a predetermined operation, the corresponding writing may mean that other components are controlled so that the aforementioned operations are performed, in addition to a case in which the scanner-side processor 110 performs directly the aforementioned operations by executing at least one piece of control.

More specifically, the scanner-side processor 110 may include RAM (not illustrated) that stores a control signal or data that is input from the outside of the 3-D scanner 100 or that is used as a storage region corresponding to various tasks that are performed in the 3-D scanner 100, a control program for control of the 3-D scanner 100 and/or ROM (not illustrated) in which a plurality of pieces of control-related information has been stored and at least one processor (not illustrated) (hereinafter referred to as an "internal processor") that executes at least one piece of control. Specifically, the scanner-side processor 110 may be implemented in a form, including at least one internal processor and a program to be processed or used in the internal processor internally and a memory element (e.g., RAM or ROM) for storing at least one of an instruction, a signal, and data.

Furthermore, the scanner-side processor 110 may include a graphic processing unit (not illustrated) for graphic processing corresponding to video. Furthermore, the processor 210 may be implemented as a system on chip (SoC) in which a core (not illustrated) and a GPU (not illustrated) have been integrated. Furthermore, the scanner-side processor 110 may include a multi-core more than a single core. For example, the scanner-side processor 110 may include a dual core, a triple core, a quad core, a hexa core, an octa core, a deca core, a dodeca core, a hexadecimal core, etc.

Furthermore, the scanner-side processor 110 may include a field-programmable gate array (FPGA), that is, a semiconductor device including a designable logic element and a programmable internal circuit, and may implement high-speed image processing by using the FPGA.

More specifically, the scanner-side processor 110 controls control signals related to at least one of an acquisition operation and a transmission operation for at least one image to be transmitted to and received from the external electronic device through the first communication module 121 that obtains image data corresponding to the at least one image that has been obtained by the one or more cameras 1321 and that performs pairing in the first frequency band and wireless communication after the pairing, and controls the image data to be transmitted to the external electronic device through the second communication module 122 that performs pairing in the second frequency band and that performs wireless communication after the pairing.

Furthermore, the second frequency band may be a frequency band different from the first frequency band. That is, the second communication module 122 may perform pairing and wireless communication in the second frequency band, that is, a frequency band different from the first frequency band.

Furthermore, the 3-D scanner 100 may further include a user interface 170. The user interface 170 may receive a user input.

Illustratively, the user interface 170 may include an input device including keys corresponding to a predetermined operation or request, etc. For example, the input device included in the user interface 170 may be formed of at least one button, a contact sensor, etc. Alternatively, the user interface 170 includes a voice recognition sensor, and may receive a voice user and recognize a user input corresponding to a predetermined operation or request based on the received user voice. Referring back to FIG. 1, the user interface 170 included in the 3-D scanner 100 may be formed of a button 190. In FIG. 1, a case in which in which the user interface 170 of the 3-D scanner 100 has been formed of one button 190 has been illustrated as an example.

As another example, the user interface 170 may be formed of a touch pad. Specifically, the user interface 170 may include a touch pad (not illustrated) combined with a display pad (not illustrated). In this case, a user interface screen may be output to the display pad. Furthermore, when a predetermined command is input through the user interface screen, the touch pad may detect the command and transmit detected information to the scanner-side processor 110. In response thereto, the scanner-side processor 110 may recognize and execute the predetermined command input by a user by interpreting the detected information.

More specifically, if the user interface 170 is formed of the touch pad, when a user touches a predetermined point of the user interface screen, the user interface 170 detects the location of the touched point. Furthermore, the user interface 170 may transmit the detected location information to the scanner-side processor 110. In response thereto, the scanner-side processor 110 may recognize a request or command of the user corresponding to a menu that has been displayed at the detected location, and may perform the recognized request or command.

Hereinafter, a case in which the user interface 170 has been formed of one button 190 as in FIG. 1 and FIG. 5 described later is described as an example.

In a disclosed embodiment of the present disclosure, control signals that are transmitted to and received from the external electronic device 500 through the scanner-side first communication module 121 may be generated in accordance with a user input. Specifically, when a user input is received through the user interface 170, the scanner-side processor 110 may transmit, to the external electronic device 500, a control signal corresponding to the received user input.

Figure 5:
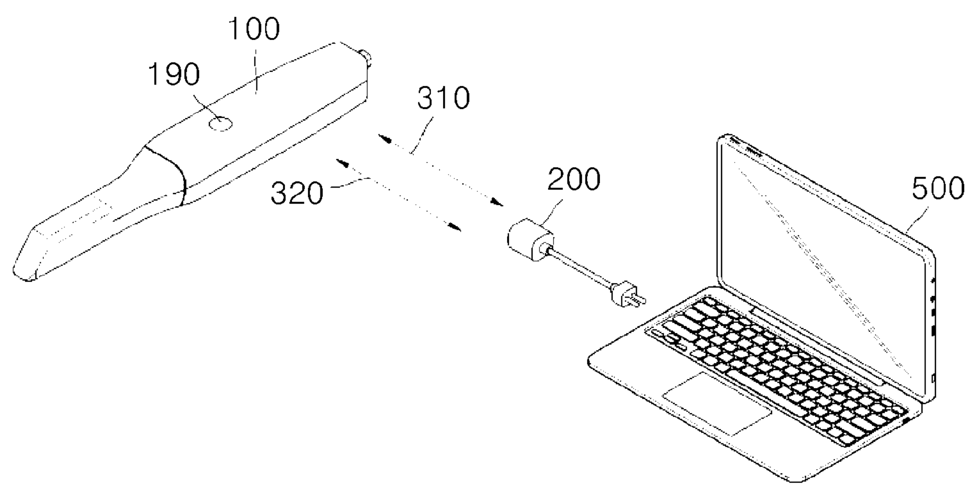
FIG. 5 is a diagram for describing communication between the 3-D scanner and the external electronic device in the wireless scanning system according to the present disclosure.

As illustrated in FIGS. 1 and 5, if the user interface 170 is formed of one button 190, a user input corresponding to a manipulation of the button 190 may correspond to at least one request depending on a form in which the button 190 is pressed. For example, a user manipulation for the button 190 may be distinguished as a double click, a long click, one click, or a one-off click for a short time. The user manipulation may be recognized as a different request based on a distinguished form of the user manipulation.

Illustratively, when a user shortly presses the button 190 once, the scanner-side processor 110 may recognize that a user input to request to start a scan on the object is received. Furthermore, when a user presses the button 190 long (or for a set time or more) once, the scanner-side processor 110 may recognize that a user input to request to end a scan on the object is received. Alternatively, when a user performs a double click on the button 190, the scanner-side processor 110 may recognize that a user input to request to transmit image data corresponding to obtained images to the external electronic device 500 is received.

As another example, when a user presses the button 190 long (or for a set time or more) once, the scanner-side processor 110 may recognize that a user input to request to perform manual pairing between the 3-D scanner 100 and a communication hub 200 is received, and may convert the state of at least one of the scanner-side first communication module 121 and the scanner-side second communication module 122 into a manual pairing state in which a pairing standby signal is applied.

Furthermore, the user interface 170 of the 3-D scanner 100 may include a plurality of buttons corresponding to a plurality of requests, respectively. In this case, the user interface 170 may recognize a corresponding request based on a selected button.

As still another example, different requests may be recognized by considering an operation state of the 3-D scanner 100 when a user manipulation for the button 190 is performed. For example, if the button 190 is shortly clicked once while the 3-D scanner 100 performs a scan, such a user input may be recognized as a request corresponding to the stop of the scan. Furthermore, when the button 190 is shortly clicked once in the state in which the intraoral scanner 201 has stopped a scan, such a user input may be recognized as a request corresponding to the restart of the scan.

As described above, the scanner-side processor 110 may generate a control signal corresponding to a received user input, and may transmit the generated control signal to the external electronic device 500 through the scanner-side first communication module 121. That is, the control signal may be a signal including a request or command corresponding to the user input that is received through the user interface 170.

Furthermore, a control signal corresponding to a user input that is received through the external electronic device 500 may be received from the external electronic device 500 through the scanner-side first communication module 121.

Furthermore, a control signal may be generated by at least one of the scanner-side processor 110 and the optical unit 130, and may be transmitted to the external electronic device 500 through the scanner-side first communication module 121.

Hereinafter, an operation of photographing, by the 3-D scanner 100, that is, one component of the wireless scanning system 1 according to a disclosed embodiment of the present disclosure, an object is described.

Figure 4:
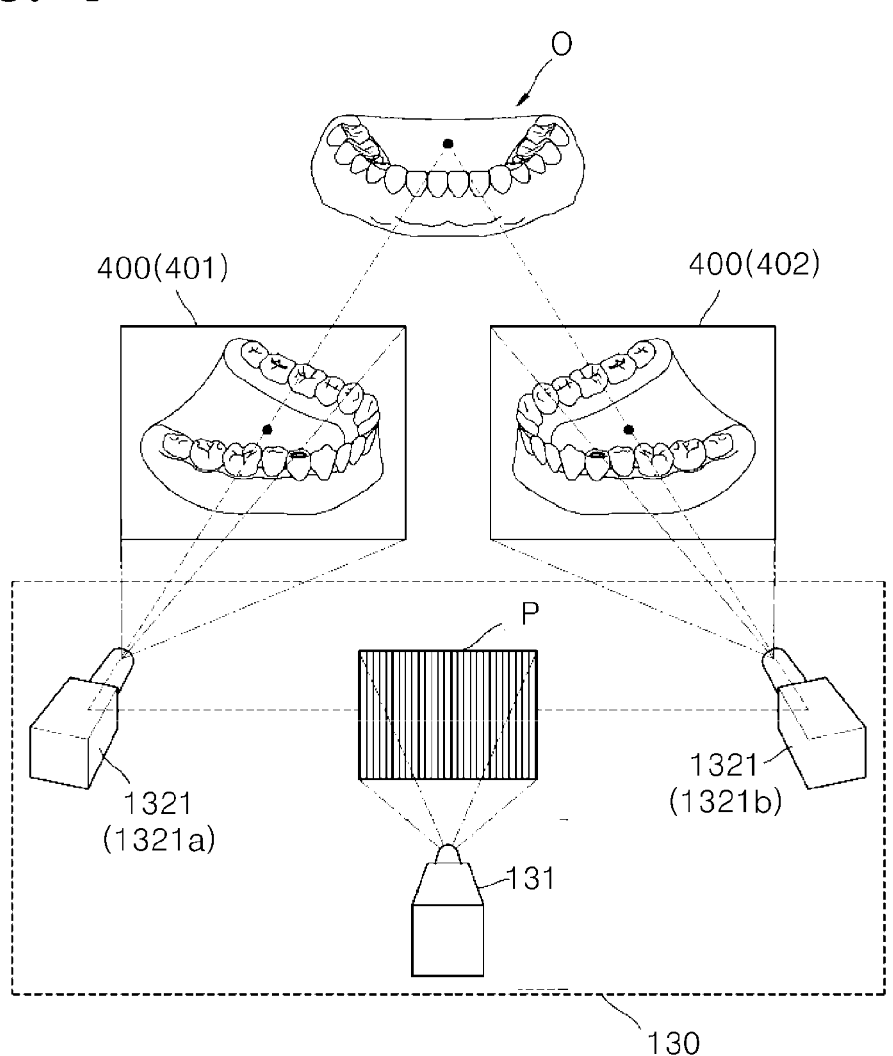
FIG. 4 is a diagram for describing an operation of photographing an object in the wireless scanning system according to the present disclosure.

FIG. 4 is a diagram for describing an operation of photographing, by the wireless scanning system 1 according to the present disclosure, the object O.

Illustratively, the camera 1321 of the 3-D scanner 100 may be formed of one or more cameras that perform an image scan by using the confocal method, and may perform an image scan by moving (or driving) the location of a lens (e.g., an object lens) that is included in a camera (not illustrated) by using the confocal method.

Alternatively, the camera 1321 of the 3-D scanner 100 may be formed of one or more cameras that perform an image scan by using an optical triangulation method, and may perform an image scan on the object O onto which pattern light has been projected by using the optical triangulation method.

In the example illustrated in FIG. 4, a case in which the camera 1321 included in the 3-D scanner 100 includes two cameras 1321*a* and 1321*b* and performs an image scan by using the optical triangulation method is illustrated and described as an example.

Referring to FIG. 4, the 3-D scanner 100 may perform an oral scan by using the optical triangulation method. Through the optical triangulation method, the object may be photographed by projecting light onto the object, and 3-D data may be obtained by using an image of the object, which has been imaged along with the light. Specifically, through the optical triangulation method, an image of the object O may be obtained by projecting light onto the object O and receiving light that is reflected by the object O. In this case, the 3-D data may include 3-D depth information of the object.

More specifically, in a disclosed embodiment of the present disclosure, in order to obtain 3-D data of a surface of the object O, a structured light with stereo vision method that uses two cameras and a projector that outputs light may be used.

Illustratively, in order to perform a scan by using the structured light with stereo vision method, the 3-D scanner 100 includes an optical unit 130. The optical unit 130 may further include the projector 131 along with the aforementioned camera module 132. In this case, the projector 131 may output a beam having a pattern that is formed by at least one of one-dimensional dot and a 2-D line. Specifically, for the scan of the mouth, that is, a kind of object O, the projector 131 may output light into the mouth, that is, the object O, by control of the scanner-side processor 110. When the projector 131 outputs the light, the two or more cameras 1321*a* and 1321*b* may obtain an image corresponding to the object O onto which the light has been projected. Furthermore, a form (or pattern) of the light that is output by the projector 131 may be changed, and the light may have various forms. In FIG. 4, a case in which the projector 131 outputs structured light P having a plurality of lines has been illustrated as an example.

The 3-D scanner 100, that is, one component of the wireless scanning system 1 according to an embodiment of the present disclosure, may project the structured light P onto the object O, and may obtain a first image 400, 401 corresponding to a left field of view and a second image 400, 402 corresponding to a right field of view through the first camera 1321*a* corresponding to the left field of view and the second camera 1321*b* corresponding to the right field of view, respectively. The 3-D scanner 100 may consecutively obtain 2-D frame images including the first image 400, 401 and second image 400, 402 of the object O. For example, when the camera module 132 operates at 100 frames per second (FPS), each of the first camera 1321*a* and the second camera 1321*b* may consecutively capture 100 frame images per second. In this case, the frame images obtained by the camera module 132 may be 2-D images corresponding to resolution of the camera 1321.

Furthermore, a plurality of frame images that are obtained by the two or more cameras 1321*a* and 1321*b* may be formatted based on another image format, for example, an HDMI format in the camera board 1322. Accordingly, the external electronic device (e.g., 500 in FIG. 1) may receive HDMI data that are obtained by formatting images obtained by the first camera 1321*a* and the second camera 1321*b*. Furthermore, the external electronic device (e.g., 500 in FIG. 1) may reconstruct a 3-D frame indicative of a surface shape of the object O from a 2-D frame including the first image 400, 401 and the second image 400, 402. Specifically, the external electronic device may obtain depth information of the object based on the first image 400, 401 and the second image 400, 402 that have been imaged along with the structured light P. Furthermore, the external electronic device may reconstruct a 3-D image or a 3-D model based on the depth information.

Furthermore, the camera board 1322 or the scanner-side processor 110 may generate a 3-D model or 3-D image of the object based on a plurality of frame images that are obtained by the two or more cameras 1321*a* and 1321*b*. In this case, the 3-D scanner 100 may transmit the generated 3-D model or 3-D image to the external electronic device (e.g., 500 in FIG. 1) over a second communication network.

In FIG. 4, a case in which the 3-D scanner 100 includes the two cameras 1321*a* and 1321*b* and the one projector 131 has been illustrated as an example. However, embodiments are not limited to the example illustrated in FIG. 4. The 3-D scanner 100 may include one camera and one projector. If the 3-D scanner 100 includes one camera and one projector, the projector may simultaneously play roles as a camera that obtains an image and a projector that projects structured light. Furthermore, according to various implementation methods of the present disclosure, the 3-D scanner 100 may include a plurality of cameras and a plurality of projectors.

The 3-D scanner 100 may obtain at least one image (e.g., a plurality of 2-D frames) by scanning the object O at predetermined time intervals (e.g., several ms to several tens of ms) while moving around the object O. Furthermore, the 3-D scanner 100 or the external electronic device (not illustrated) (e.g., 500 in FIG. 1) may obtain a plurality of 3-D frames from a plurality of 2-D frames. Illustratively, each of one or more image sensors that are included in the camera module 132 included in the 3-D scanner 100 may obtain several tens to several hundreds of 2-D frames per second. Specifically, the image sensor may obtain several tens to several hundreds of 3-D frames per second by using a plurality of 2-D frames that are obtained by the 3-D scanner 100. In this case, each 3-D frame may be generated based on a plurality of 2-D frames. For example, one sheet of a 3-D frame may be generated based on several tens of 2-D frames.

When the external electronic device (not illustrated) (e.g., 500 in FIG. 1) receives image data corresponding to 2-D frames that are obtained from the 3-D scanner 100, the external electronic device (not illustrated) may reconstruct a 3-D image or 3-D model of the entire object by combining a plurality of 3-D frames or arranging the locations of the plurality of 3-D frames based on received image data.

Illustratively, each of the first camera 1321*a* and the second camera 1321*b* may obtain 100 2-D frames or more per second. Each of the first camera 1321*a* and the second camera 1321*b* may capture an image having M*N resolution. In this case, M and N each have a value of a natural number. M may be the number of pixels of an obtained image in a horizontal direction. N may be the number of pixels of the obtained image in a vertical direction.

Hereinafter, a case in which each of one or more images obtained by or more image sensors (not illustrated) included in the camera 1321 (e.g., the first camera 1321*a* and the second camera 1321*b*), respectively, is a 2-D frame formed of 200 pixel values in width and 200 pixel values in height (i.e., M=200 and N=200) is illustrated and described as an example, for convenience of description. Furthermore, in the aforementioned example, a case in which M and N have the same value has been taken as an example, but M and N may have different natural number values.

Furthermore, one pixel value may be represented as 8 bits. In this case, each of frame images obtained by the first camera 1321*a* and the second camera 1321*b*, respectively, may be image data having the size or resolution of 200×200×8 bits=4000 bytes.

Furthermore, the camera board 1322 may generate image data (specifically, HDMI data) by formatting the format of a plurality of images obtained by the first camera 1321*a* and the second camera 1321*b* according to a high definition multimedia interface (HDMI) format. In this case, the HDMI data may be 2K data, 4K data, or 8K data having the HDMI format. In this case, the HDMI format is a form of an image frame having resolution that is defined in the HDMI standard, and may have a format, such as 1920×1080=2K resolution, 4096×2160=4K resolution, or 7680×4320=8K resolution.

Hereinafter, resolution of an image that is obtained by the camera (e.g., the first camera 1321*a* and the second camera 1321*b*) included in the intraoral scanner 100 is called "first resolution", and resolution of image data having the HDMI format is called "second resolution", for convenience of description.

Furthermore, the first resolution may mean total resolution of one or more images that are obtained by the camera 225 included in an intraoral scanner (e.g., 100 or 101) at the same time point. For example, if the intraoral scanner (e.g., 100 or 101) includes the two cameras of the first camera 1321*a* and the second 1321*b*, the camera intraoral scanner may obtain the first image 400, 401 and the second image 400, 402 at the same time point. Furthermore, if each of the two cameras 1321*a* and 1321*b* has resolution of 200 pixels in width and 200 pixels in height, when two images that are obtained by the two cameras 1321*a* and 1321*b* once at the same time point are added in the horizontal direction, the added image of the two images may be represented to have resolution of 400 pixels in width and 200 pixels in height. That is, if the two images obtained by the two cameras 1321*a* and 1321*b* included in the 3-D scanner 100 are represented as one image, the two images may become an image having resolution of 400 pixels in width and 200 pixels in height. Hereinafter, one added image of two images that are obtained by the two cameras 1321*a* and 1321*b* at the same time point is called a "raw image", for convenience of description.

In the aforementioned example, the first resolution may be a multiplied value of 200 pixels in width and 200 pixels in height or may be a multiplied value of 400 pixels in width and 200 pixels in height. The second resolution may be 2K, 4K, 8K, etc.

The 3-D scanner 100, that is, one component of the wireless scanning system 1 according to a disclosed embodiment of the present disclosure, may generate HDMI data, including the pixel values of frame images obtained by the first camera 1321*a* and the second camera 1321*b*, respectively, as in the aforementioned example, and may transmit the HDMI data to the external electronic device (not illustrated) (e.g., 500 in FIG. 1) without any change. Specifically, the 3-D scanner 100 may format the pixel values of the frame images obtained by the first camera 1321*a* and the second camera 1321*b*, respectively, according to the HDMI format so that the pixel values of the frame images obtained by the first camera 1321*a* and the second camera 1321*b*, respectively, are included without any change.

Hereinafter, in the wireless scanning system 1 according to a disclosed embodiment of the present disclosure, a construction of the communication hub 200 that forms pairing with the 3-D scanner 100 and the first frequency band and the second frequency band in which pairing is formed so that the 3-D scanner 100 and the external electronic device 500 mutually perform wireless communication are described.

FIG. 5 is a diagram for describing communication between the 3-D scanner 100 and the external electronic device 500 in the wireless scanning system 1 according to the present disclosure.

Referring to FIG. 5, the 3-D scanner 100, that is, one component of the wireless scanning system 1, may be a wireless scanner. Illustratively, the 3-D scanner 100 may include a battery (not illustrated) capable of supplying power to internal parts and the scanner-side communication unit 120 capable of communicating with other devices that are formed by being spaced apart from the 3-D scanner 100. A wireless structure of the 3-D scanner 100 is designed and manufactured in order to improve use convenience of a user of the 3-D scanner 100. Accordingly, the 3-D scanner 100 may communicate with the external electronic device 500 by using a wireless communication method.

In order to assign a wireless communication function to the external electronic device 500 or for more smooth wireless communication of the external electronic device 500, the wireless scanning system 1 according to a disclosed embodiment of the present disclosure may include the communication hub 200. The communication hub 200 may be included in the external electronic device 500 internally or externally.

Illustratively, the communication hub 200 that performs wireless communication with the 3-D scanner 100 may be formed in a form in which the communication hub 200 is included in the external electronic device 500.

As another example, the communication hub 200 that performs wireless communication with the 3-D scanner 100 may be formed as a physical device separated from the external electronic device 500. More specifically, the external electronic device 500 may be externally connected to the communication hub 200 through a connector (not illustrated). If the communication hub 200 is formed as a physical device separated from the external electronic device 500, although the external electronic device 500 does not support communication according to a first communication network 310 and a second communication network 320, communication with the 3-D scanner 100 can be conveniently made possible by attaching the communication hub 200 to the external electronic device 500.

Referring to FIGS. 3 and 5, for smooth wireless communication between the 3-D scanner 100 and the external electronic device 500, the 3-D scanner 100 and communication hub 200 of the wireless scanning system 1 according to a disclosed embodiment of the present disclosure may form pairing. The "pairing" may mean that two different devices are connected in pair and wireless communication is performed between the connected devices. After pairing is formed between the two devices, the wireless communication of each of the two devices with another device (e.g., a third device) is limited. Accordingly, the stable and rapid transmission and reception of data between the paired two devices are made possible.

The 3-D scanner 100 and the communication hub 200 may form pairing in two frequency bands. Illustratively, the scanner-side communication unit 120 of the 3-D scanner 100 may include the scanner-side first communication module 121 and the scanner-side second communication module 122. The scanner-side first communication module 121 may perform pairing (e.g., first pairing) with the communication hub 200 over the first communication network 310 that uses the first frequency band. The scanner-side second communication module 122 may perform pairing (e.g., second pairing) with the communication hub 200 over the second communication network 320 that uses the second frequency band.

In this case, the first frequency band that is used by the scanner-side first communication module 121 may be a frequency band, such as 2.4 GHz or 5 GHZ. The scanner-side first communication module 121 may output a control signal by converting the control signal into a wireless signal having the first frequency band. The scanner-side first communication module 121 may receive a control signal from the external electronic device 500 or transmit a control signal to the external electronic device 500.

Furthermore, the second frequency band that is used by the scanner-side second communication module 122 may be a frequency band of 30 to 300 GHz (more specifically 60 GHZ) for transmitting a millimeter wave, that is, a wireless signal that enables the wavelength of a wireless signal to become 1 to 10 millimeters. The 3-D scanner 100 can rapidly transmit image data to the external electronic device 500 through the scanner-side second communication module 122.

According to the aforementioned contents, the first frequency band of the first communication network 310, which is used by the scanner-side first communication module 121, may be formed to be lower than the second frequency band (i.e., has a lower frequency) of the second communication network 320, which is used by the scanner-side second communication module 122. Accordingly, the 3-D scanner 100 can transmit and receive control signals by using the first frequency band, and can transmit and receive image data by using the second frequency band.

Furthermore, a communication network (e.g., the second communication network) that uses a high frequency band may be suitable for rapidly transmitting a large amount of data. A communication network (e.g., the first communication network) that uses a low frequency band may be suitable for transmitting a signal having a low capacity. Accordingly, each of the 3-D scanner 100 and the communication hub 200 may transmit and receive signals and/or data that are transmitted and received over a communication network that uses a suitable frequency band.

The first frequency may a great band have radioactivity property because it has a relatively low frequency. The second frequency band may have a great straightness property because it has a relatively high frequency. Accordingly, the communication distance of the first frequency band that is used in the first communication network 310 may be formed to be greater than the communication distance of the second frequency band that is used in the second communication network 320.

Hereinafter, a process of pairing being formed within the wireless scanning system 1 according to a disclosed embodiment of the present disclosure is described in detail with reference to related drawings.

FIG. 6 is a diagram for g communication between the 3-D scanner 100 and the external electronic device 500 in detail in the wireless scanning system 1 according to the present disclosure. FIG. 7 is a diagram for describing a process of transmitting and receiving control signals and image data between the 3-D scanner 100 and the communication hub 200 in the wireless scanning system 1 according to the present disclosure.

Referring to FIGS. 6 and 7, in the wireless scanning system 1 according to a disclosed embodiment of the present disclosure, for wireless communication between the 3-D scanner 100 and the external electronic device 500, the 3-D scanner 100 may mutually transmit and receive control signals and/or image data to and from the communication hub 200 that is connected to the external electronic device 500.

The 3-D scanner 100 may include the scanner-side processor 110, the scanner-side communication unit 120, the optical unit 130, a scanner-side storage unit 140, a cooling fan 150, etc.

As in the aforementioned contents, the scanner-side processor 110 may control an operation of the 3-D scanner 100 by performing at least one piece of control. In this case, the scanner-side processor 110 may control at least one of the scanner-side first communication module 121 and the scanner-side second communication module 122 in the manual pairing state. In a disclosed embodiment of the present disclosure, the manual pairing state may mean a state in which a pairing standby signal is applied to one arbitrary device in order for the one arbitrary device to form pairing with another device. The scanner-side processor 110 may check pairing data of the 3-D scanner 100, and may control at least one of the scanner-side first communication n module 121 and the scanner-side second communication module 122 in the manual pairing state by applying the pairing standby signal to the at least one module based on the pairing data.

Furthermore, the scanner-side processor 110 may control the optical unit 130 so that the optical unit 130 performs a predetermined operation. Illustratively, the scanner-side processor 110 may control the projector 131 of the optical unit 130 so that the projector 131 projects structured light toward the object, and may control the camera module 132 of the optical unit 130 so that the camera module 132 obtains image data of the object by receiving light that is reflected by a surface of the object.

The 3-D scanner 100 of the wireless scanning system 1 according to a disclosed embodiment of the present disclosure may include the optical unit 130. The optical unit 130 may include the projector 131 that projects predetermined light toward the object and the camera module 132 that obtains image data.

The projector 131 projects predetermined light and/or a predetermined pattern onto the object so that the camera module 132 can obtain a color and shape of image data, which represent the object. The projector 131 includes a first type light source 1311. The first type light source 1311 may operate in order to obtain the color and shape of the image data. Illustratively, the first type light source 1311 may include a red light source, a green light source, and a blue light source, and may obtain a first color image, a second color image, and a third color image by projecting light sources simultaneously or sequentially. The color of the image data may be obtained by a combination of the color images. However, the first type light source 1311 is not limited to the listed examples, and may be a light source that complies with various known color acquisition methods.

The first type light source 1311 may be projected onto the object along with a specific pattern. Light that is projected onto the object along with the specific pattern may be structured light. The camera module 132 may obtain a shape (i.e., a 3-D shape of the object) of image data by obtaining an image of the object onto which the structured light has been projected.

Furthermore, the projector 131 may include a second type light source 1312 different from the first type light source 1311 that is necessary for the camera module 132 to obtain image data. The second type light source 1312 may be a light source for sterilizing the inside of the 3-D scanner 100. In particular, if the 3-D scanner 100 is the intraoral scanner 101 that is directly drawn into and drawn out from the mouth of a patient, an alien substance within the mouth of the patient may be introduced into the 3-D scanner 100, causing the insanitation of the 3-D scanner 100. Accordingly, the 3-D scanner 100 can be sterilized by projecting light that is generated by the second type light source 1312 onto the inside of the 3-D scanner 100. The light that is generated by the second type light source 1312 may be UV-C light, but is not essentially limited to the disclosed example. Light having any form capable of a sterilization action may be used.

The 3-D scanner 100 may further include the scanner-side storage unit 140. The scanner-side storage unit 140 may store information of the 3-D scanner 100 (a serial number of the scanner), pairing data (information of a paired device), and information related to control of the scanner. According to circumstances, the scanner-side storage unit 140 may store image data that are generated by an operation of the camera module 132. At least one of known recording devices, such as ROM, RAM, an SSD, an HDD, and flash memory, may be used as the scanner-side storage unit 140, and a detailed description thereof is omitted.

The 3-D scanner 100 may further include the cooling fan 150. The cooling fan 150 may enable the 3-D scanner 100 to have an optimal temperature for obtaining image data indicative of the object. Illustratively, when it is determined that the 3-D scanner 100 has been overheated by a temperature measurement sensor (not illustrated) embedded therein, the scanner-side processor 110 may drop a temperature of the 3-D scanner 100 by controlling the cooling fan 150. Control over the cooling fan 150 may include rapidly or slowly controlling the fan speed of the cooling fan 150.

The communication hub 200 that forms pairing with the 3-D scanner 100 may include a communication hub-side processor 210. The communication hub-side processor 210 may perform control for transmitting a control signal from the external electronic device 500 to the 3-D scanner 100 by using a communication hub-side communication unit 220 described later or receiving a control signal and/or image data from the 3-D scanner 100 and transferring the control signal and/or the image data to the external electronic device 500. Incidentally, if the 3-D scanner 100 transmits image data by encoding the format of the image data into the HDMI format, the communication hub-side processor 210 may decode the encoded HDMI data, may obtain a 2-D frame image before the image data are formatted into the HDMI data, and may transfer the 2-D frame image to the external electronic device 500. Accordingly, the external electronic device 500 may rapidly restore a 3-D model or a 3-D image that is necessary for the diagnosis of the mouth based on received 2-D frame images.

Furthermore, the communication hub 200 may include the communication hub-side communication unit 220 for communication with the 3-D scanner 100. The communication hub-side communication unit 220 may include a communication hub-side first communication module 221 and a communication hub-side second communication module 222. More specifically, the communication hub-side first communication module 221 may perform pairing (e.g., the first pairing) with the 3-D scanner 100 over the first communication network 310 that uses the first frequency band. The communication hub-side second communication module 222 may perform pairing (e.g., the second pairing) with the 3-D scanner 100 over the second communication network 320 that uses the second frequency band.

Furthermore, the first frequency band that is used by the communication hub-side first communication module 221 may be a frequency band, such as 2.4 GHz or 5 GHZ. The communication hub-side first communication module 221 may output a control signal by converting the control signal into a wireless signal having the first frequency band. The communication hub-side first communication module 221 may receive a control signal from the 3-D scanner 100 or transmit a control signal to the 3-D scanner 100.

Furthermore, the second frequency band that is used by the communication hub-side second communication module 222 may be a frequency band of 60 GHZ. The communication hub 200 may rapidly receive image data from the 3-D scanner 100 through the communication hub-side second communication module 222, and may transmit the image data to the external electronic device 500.

That is, the communication hub-side first communication module 221 may perform communication in accordance with the scanner-side first communication module 121. The communication hub-side second communication module 222 may perform communication in accordance with the scanner-side second communication module 122.

Furthermore, the 3-D scanner 100 and the communication hub 200 may transmit and receive control signals mutually bidirectionally. Illustratively, the scanner-side first communication module 121 and the communication hub-side first communication module 221 may perform wireless communication bidirectionally. The scanner-side first communication module 121 and the communication hub-side first communication module 221 may be responsible for the transmission and reception of control signals over the first communication network 310 that uses the first frequency band. Specifically, the scanner-side first communication module 121 and the communication hub-side first communication module 221 may transmit and receive wireless signals having the first frequency band (e.g., a 2.4 GHz or 5 GHz band) lower than the second frequency band, specifically, radio frequency (RF) signals corresponding to control signals.

Furthermore, the scanner-side second communication module 122 and the communication hub-side second communication module 222 may perform unidirectional wireless communication from the 3-D scanner 100 to the communication hub 200 in the second frequency band (e.g., a 60 GHZ frequency band) for the fast transmission of image data. Alternatively, the scanner-side second communication module 122 and the communication hub-side second communication module 222 may perform bidirectional wireless communication.

Each of the communication modules 121, 122, 221, and 222 may include an antenna (not illustrated) for the transmission and reception of control signals and/or image data. The antenna may radiate or receive a control signal and/or image data.

If the scanner-side second communication module 122 is responsible for only the transmission of data as in the aforementioned example, a case in which a transmission operation of the corresponding communication module 122 is delayed by a reception operation that is performed in one scanner-side first communication module 121 does not occur. Accordingly, the scanner-side second communication module 122 performs unidirectional wireless communication that is responsible for only transmission so that image data can be transmitted to the communication hub 200 rapidly without delay. Furthermore, the scanner-side first communication module 121 performs bidirectional wireless communication with the communication hub-side first communication module 221 so that a control signal that is necessary for control of the 3-D scanner 100 can be transmitted or received at any time regardless of the transmission of image data. Accordingly, the stability of a control operation can be improved by the immediate transmission and reception of control signals while improving transmission efficiency of image data by the 3-D scanner 100.

Hereinafter, a process of filtering with other devices being performed in order for the 3-D scanner 100 and the communication hub 200 to be mutually paired in the wireless scanning system 1 is described.

Figure 8:
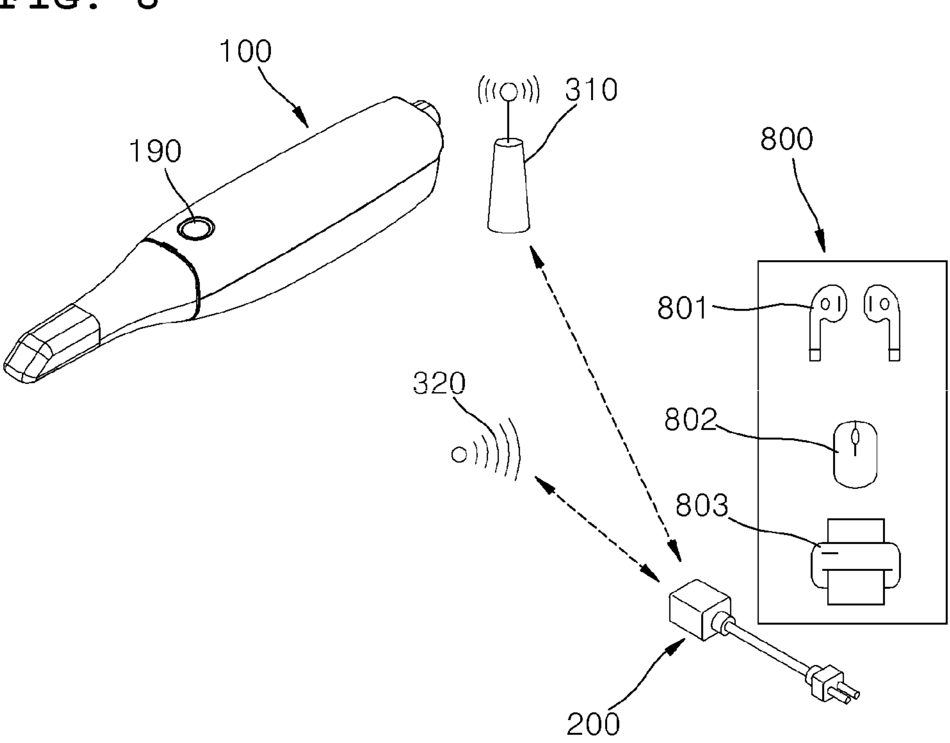
FIG. 8 is a diagram for describing a process of filtering, by the 3-D scanner, the communication hub in the wireless scanning system according to the present disclosure.

FIG. 8 is a diagram for describing a process of filtering, by the 3-D scanner 100, the communication hub 200 in the wireless scanning system 1 according to the present disclosure.

Referring to FIGS. 7 and 8, in the wireless scanning system 1 according to a disclosed embodiment of the present disclosure, the 3-D scanner 100 may filter the communication hub 200 in order to be paired with the communication hub 200. Illustratively, the scanner-side processor 110 may control the scanner-side first communication module 121 that uses the first frequency band in a pairing state. The scanner-side first communication module 121 may filter the communication hub 200 based on at least one piece of filtering information.

In this case, the 3-D scanner 100 may store the filtering information in the scanner-side storage unit 140. The filtering information may include a unique service universal unique identifier (UUID) and device name. The scanner-side first communication module 121 may distinguish the communication hub 200 from other devices 800, such as a wireless earphone 801, a wireless mouse 802, and a network printer 803, based on filtering information by filtering the communication hub 200. The scanner-side first communication module 121 can prevent pairing between the other devices 800, which are present in a space in which a user uses the 3-D scanner 100, and the 3-D scanner 100.

Hereinafter, a process of pairing between the 3-D scanner 100 and the communication hub 200 being formed is described.

FIG. 9 is a diagram for describing a process of the scanner-side first communication module 121 of the 3-D scanner 100 being controlled in the manual pairing state in the wireless scanning system 1 according to the present disclosure. FIG. 10 is a diagram for describing a process of the scanner-side second communication module 122 being controlled in the manual pairing state in the state in which the scanner-side first communication module of the 3-D scanner has formed the first pairing with the communication hub in the wireless scanning system 1 according to the present disclosure. FIG. 11 is a diagram for describing the state in which the scanner-side second communication module 122 of the 3-D scanner 100 has formed the second pairing with the communication hub 200 in the wireless scanning system 1 according to the present disclosure.

Referring to FIG. 9, the scanner-side processor 110 may control the scanner-side first communication module 121 in the manual pairing state. The scanner-side first communication module 121 having the state changed into the manual pairing state may filter the communication hub 200.

When the 3-D scanner 100 filters the communication hub 200, the scanner-side first communication module 121 and the communication hub-side first communication module 221 may form the first pairing. As illustrated in FIGS. 7 and 10, according to the formed first pairing, the 3-D scanner 100 and the communication hub 200 may mutually transmit and receive control signals over the first communication network 310 that uses the first frequency band.

Referring to FIG. 10, the scanner-side processor 110 may control the scanner-side second communication module 122 that uses the second frequency band in the pairing state. The scanner-side second communication module 122 may filter (distinguish) the communication hub 200 from the other devices 800 based on the aforementioned filtering information. The scanner-side second communication module 122 and the communication hub-side second communication module 222 may form the second pairing. As illustrated in FIG. 11, according to the formed second pairing, the 3-D scanner 100 and the communication hub 200 may mutually transmit and receive (or unidirectionally transmit/receive) image data over the second communication network 320 that uses the second frequency band.

The second pairing between the 3-D scanner 100 and the communication hub 200 may be formed after the first pairing between the 3-D scanner 100 and the communication hub 200.

More specifically, the scanner-side processor 110 controls the scanner-side first communication module 121 that uses the first frequency band in the manual pairing state in order to preferentially form the first pairing. The scanner-side first communication module 121 and the communication hub-side first communication module 221 form the first pairing.

When the scanner-side first communication module 121 and the communication hub-side first communication module 221 form the first pairing, the scanner-side processor 110 controls the scanner-side second communication module 122 that uses the second frequency band in the manual pairing state. The scanner-side second communication module 122 and the communication hub-side second communication module 222 may form the second pairing.

As the 3-D scanner 100 and the communication module 200 form multi-pairing including the first pairing and the second pairing as described above, the pairing of the 3-D scanner 100 and the communication module 200 can be stably maintained.

Furthermore, by the scanner-side first communication module 121 and the communication hub-side first communication module 221 between which the first pairing has been formed, control signals related to at least one of an acquisition operation and transmission operation of image data may be mutually transmitted and received in the first frequency band. By the scanner-side second communication module 122 and the communication hub-side second communication module 222 between which the second pairing has been formed, image data may be mutually transmitted and received in the second frequency band. In particular, in the scanner-side second communication module 122 and the communication hub-side second communication module 222 between which the second pairing has been formed, the 3-D scanner 100 may transmit image data to the communication hub 200 unidirectionally in response to a control signal related to a transmission operation.

Hereinafter, a communication distance, that is, a factor that gives influence when the first pairing and the second pairing are formed between the 3-D scanner 100 and the communication hub 200 is described.

Figure 12:
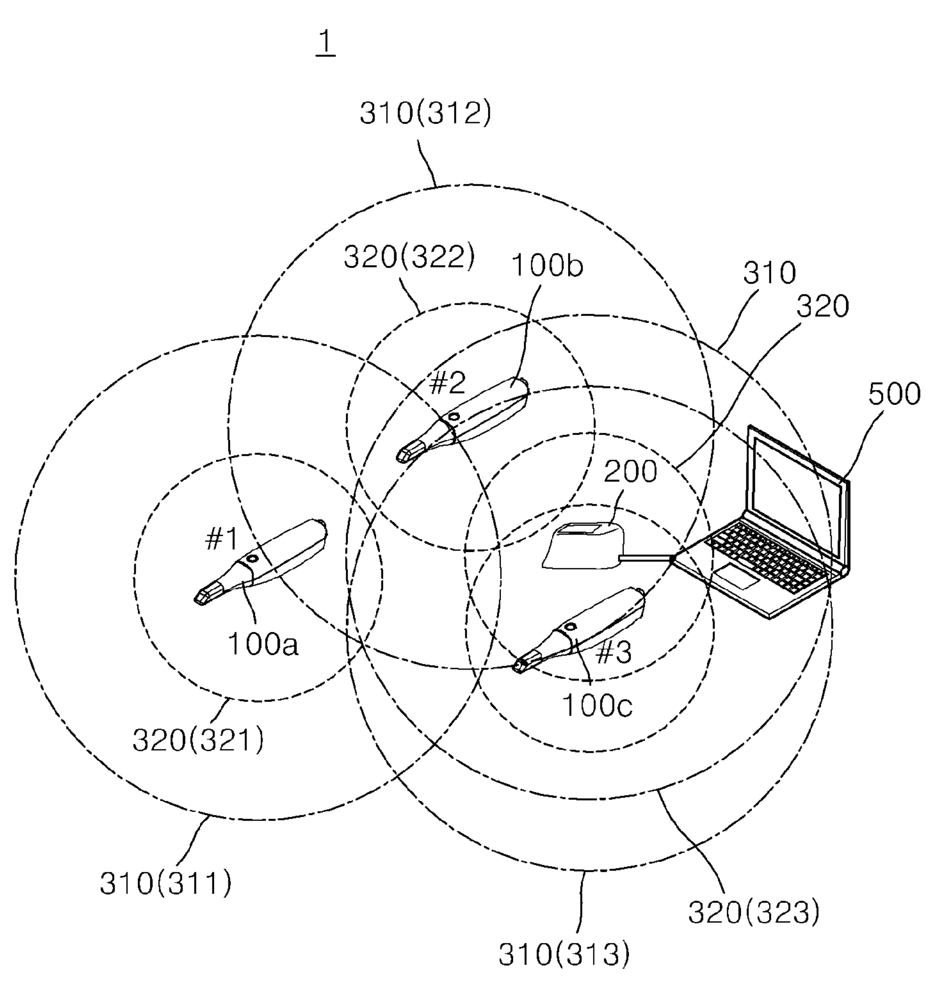
FIG. 12 is a diagram for describing the communication distances of a first frequency band and a second frequency band in which the 3-D scanner and the communication hub are paired in the wireless scanning system according to the present disclosure.

FIG. 12 is a diagram for describing communication distances of the first frequency band and the second frequency band in which the 3-D scanner 100 and the communication hub 200 are paired in the wireless scanning system 1 according to the present disclosure.

Referring to FIG. 12, in the wireless scanning system 1 according to a disclosed embodiment of the present disclosure, the 3-D scanner 100 and the communication hub 200 may be disposed to be spaced apart from each other. If a distance between the 3-D scanner 100 and the communication hub 200 is excessively distant, pairing and wireless communication may be impossible. In particular, in the wireless scanning system 1 according to a disclosed embodiment of the present disclosure, different frequency bands are used. In order to form both the first pairing and the second pairing, it is important for the 3-D scanner 100 and the communication hub 200 to maintain a close distance.

The first communication network 310 that uses the first frequency band that is relatively low may have a relatively long communication distance. The second communication network 320 that uses the second frequency band that is relatively high may have a relatively short communication distance. Accordingly, although the first pairing between the 3-D scanner 100 and the communication hub 200 is formed, a case in which the second pairing is not formed may occur. In such a case, it is necessary to limit some operations of the 3-D scanner 100 because the 3-D scanner 100 and the communication hub 200 cannot use the second communication network 320 over which image data are transmitted and received.

Assuming that a first 3-D scanner **100*a* is disposed at a first arbitrary location, the communication hub 200 is not disposed in a first frequency band range 311 and second frequency band range 321 of the first 3-D scanner 100*a*. Furthermore, the first 3-D scanner 100*a* is not disposed in the first frequency band range 310 and second frequency band range 320 of the communication hub 200. In such a case, both the first pairing and the second pairing are not formed between the first 3-D scanner 100*a* and the communication hub 200**.

Assuming that a second 3-D scanner **100*b* is disposed at a second arbitrary location, the communication hub 200 is disposed in a first frequency band range 312 of the second 3-D scanner 100*b*, but the communication hub 200 is not disposed in a second frequency band range 322 of the second 3-D scanner 100*b*. Likewise, the second 3-D scanner 100*b* is disposed in a first frequency band range 310 of the communication hub 200, but the second 3-D scanner 100*b* is not disposed in a second frequency band range 320 of the communication hub 200. In such a case, the second 3-D scanner 100***b* and the communication hub 200 form the first pairing, but do not form the second pairing.

Assuming that a third 3-D scanner 100*c* is disposed at a third arbitrary location, the communication hub 200 is disposed in a first frequency band range 313 and second frequency band range 323 of the third 3-D scanner 100*c*. Likewise, the third 3-D scanner 100*c* is disposed in the first frequency band range 310 and second frequency band range 320 of the communication hub 200. In such a case, the third 3-D scanner 100*c* and the communication hub 200 may form the first pairing and the second pairing.

Hereinafter, a process of some operations of some components of the wireless scanning system 1 being limited when any one of the first pairing and the second pairing fails is described.

Figure 14:
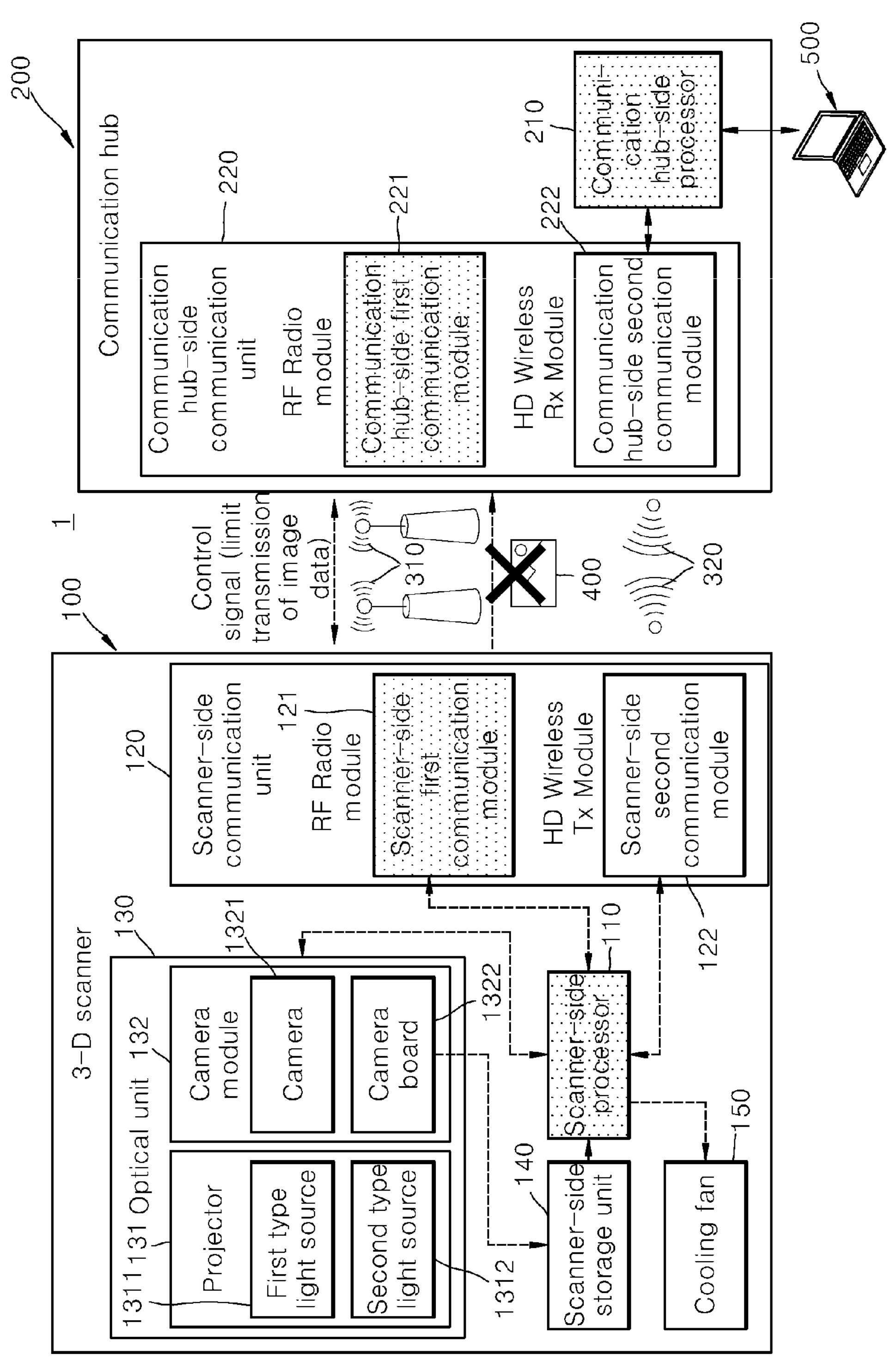
FIG. 14 is a diagram for describing a process of limiting the transmission of image data by the 3-D scanner when any one of pieces of forming of first pairing and second pairing between the 3-D scanner and the communication hub fails in the wireless scanning system according to the present disclosure.

FIG. 13 is a diagram for describing a process of limiting the acquisition of image data by the 3-D scanner 100 when any one of the forming of the first pairing and the forming of the second pairing between the 3-D scanner 100 and the communication hub 200 fails in the wireless scanning system 1 according to the present disclosure. Furthermore, FIG. 14 is a diagram for describing a process of limiting the transmission of image data by the 3-D scanner 100 when any one of the forming of the first pairing and the forming of the second pairing between the 3-D scanner 100 and the communication hub 200 fails in the wireless scanning system 1 according to the present disclosure.

In the wireless scanning system 1 according to a disclosed embodiment of the present disclosure, when any one of the first pairing and the second pairing fails, the transmission and reception of control signals and/or the transmission and reception of image data may be limited. In particular, when the second pairing over the second communication network 320 that uses the second frequency band having a short communication distance fails, there is a problem in that it is difficult to stably transmit and receive a large amount of image data. Furthermore, if the stable transmission and reception of image data become difficult, there is a problem in that image data obtained by the 3-D scanner 100 are lost in the state in which the image data cannot be used due to a small capacity of the scanner-side storage unit 140 of the 3-D scanner 100 or it is difficult to check whether the object is scanned normally.

As a method such for solving a problem, as illustrated in FIG. 13, when any one of the first pairing and the second pairing fails, in the wireless scanning system 1 according to a disclosed embodiment of the present disclosure, the external electronic device 500 may send (transmit) a control signal to limit an acquisition operation of image data by the 3-D scanner 100 to the scanner-side processor 110 through the communication hub 200. That is, the acquisition operation of the image data by the 3-D scanner 100 may be limited in the state in which the image data cannot be transmitted in real time through the scanner-side second communication module 122 and the communication hub-side second communication module 222 between which the second pairing has not been formed.

When it is determined that the second pairing between the 3-D scanner 100 and the communication hub 200 has failed, the processor (not illustrated) of the external electronic device 500 transmits a control signal to limit an acquisition operation of image data by the 3-D scanner 100 to the communication hub 200. The communication hub-side processor 210 of the communication hub 200 transmits, to the scanner-side first communication module 121, the control signal to limit the acquisition operation of the image data in the first frequency band through the communication hub-side first communication module 221 in which the first pairing has been formed. The scanner-side first communication module 121 that has received the control signal to limit the acquisition operation of the image data may transmit the control signal to the scanner-side processor 110. The scanner-side processor 110 may control operations of some components of the 3-D scanner 100 in response to the control signal.

Illustratively, the scanner-side processor 110 may limit operations of at least some components of the optical unit 130, among the components of the 3-D scanner 100, in response to the control signal to limit the acquisition operation of the image data. The scanner-side processor 110 may limit operations of components related d to the acquisition of the image data. More specifically, the scanner-side processor 110 may limit operations of both the first type light source 1311 and camera module 132 of the optical unit 130.

Accordingly, the projector 131 cannot project the first type light source 1311 for obtaining a color and shape of the object toward a surface of the object. The camera 1321 of the camera module 132 cannot receive a light source that is reflected by the surface of the object. The camera board 1322 may be controlled to not generate image data. Accordingly, there are advantages in that the unnecessary acquisition of image data by the 3-D scanner 100 is limited under an environment in which the second pairing has not been formed and resources accompanied by the unnecessary acquisition of image data by the 3-D scanner 100 are reduced.

Incidentally, if any one of the first pairing and the second pairing has not been formed, the state in which specific pairing has failed may be visually displayed through the aforementioned display unit of the external electronic device. Furthermore, in addition to the display unit, a pairing failure may be represented through the vibration of an actuator (not illustrated) embedded in the 3-D scanner 100, or a pairing failure may be represented by the playback of an alarm through a speaker (not illustrated) that is embedded in the 3-D scanner 100, the communication hub 200, and the external electronic device 500 or that is formed separately therefrom.

As another method for solving such a problem, as illustrated in FIG. 14, in the wireless scanning system 1 according to a disclosed embodiment of the present disclosure, when any one of the first pairing and the second pairing fails, the external electronic device 500 may send (transmit), to the scanner-side processor 110, a control signal to limit the transmission operation of image data by the 3-D scanner 100 through the communication hub 200. That is, in the state in which the image data cannot be transmitted in real time through the scanner-side second communication module 122 and the communication hub-side second communication module 222 between which the second pairing has not been formed, a transmission operation of the image data by the 3-D scanner 100 may be limited.

When it is determined that the second pairing between the 3-D scanner 100 and the communication hub 200 has failed, the processor (not illustrated) of the external electronic device 500 transmits, to the communication hub 200, a control signal to limit a transmission operation of image data by the 3-D scanner 100. The communication hub-side processor 210 of the communication hub 200 transmits, to the scanner-side first communication module 121, a control signal to limit the transmission operation of the image data in the first frequency band through the communication hub-side first communication module 221 with which the first pairing has been formed. The scanner-side first communication module 121 that has received the control signal to limit the transmission operation of the image data may transmit the control signal to the scanner-side processor 110. The scanner-side processor 110 limits the transmission of the image data by the 3-D scanner 100 in response to the control signal.

In this case, a method of limiting the transmission of the image data by the 3-D scanner 100 may mean that image data 400 generated by the camera module 132 are not transmitted to the scanner-side first communication module 121. The scanner-side first communication module 121 may be inappropriate for transmitting and receiving a large amount of image data unlike a control signal because the scanner-side first communication module 121 transmits the control signal over the first communication network 310 that uses the first frequency band. Furthermore, if control signals and image data are transmitted and received together over the same communication network, there is in danger of not obtaining a 3-D model having a very high quality because a data loss may occur in a process of classifying whether data that are transmitted and received are control signals or image data. Accordingly, the scanner-side processor 110 stores image data obtained by the camera module 132 in the scanner-side storage unit 140, but may not transmit the image data to the scanner-side first communication module 121.

According to the aforementioned contents, there are advantages in that it is possible to prevent a loss of image data that are transmitted from the 3-D scanner 100 to the external electronic device 500 and system resources can be reduced by limiting at least one of an acquisition operation of the image data and a transmission operation of the image data if robust pairing (dual pairing) between the 3-D scanner 100 and the communication hub 200 has not been formed.

However, when it is inevitable, if the second pairing between the scanner-side second communication module 122 and the communication hub-side second communication module 222 has failed, the scanner-side processor 110 may control the 3-D scanner 100 to transmit image data through the scanner-side first communication module 121 with which the first pairing has been formed and then to transmit the image data through the scanner-side second communication module 122 when the second pairing is formed again.

Regardless of whether the first pairing and the second pairing succeed or fail, the second type light source 1312 and cooling fan 150 of the 3-D scanner 100 may operate. The second type light source 1312 and the cooling fan 150 do not influence the transmission of image data, and involve a sterilization operation and a cooling operation for maintaining performance of the 3-D scanner 100 regardless of the first pairing and the second pairing. Accordingly, there is an advantage in that the 3-D scanner 100 can be maintained with high performance because the second type light source 1312 and the cooling fan 150 operate regardless of whether the 3-D scanner 100 and the communication hub 200 are paired.

Hereinafter, a pairing method for the wireless scanning system according to a disclosed embodiment of the present disclosure is described in detail. In describing the pairing method for the wireless scanning system according to the present disclosure, contents redundant with the aforementioned contents are mentioned in brief or a description thereof is omitted.

Figure 15:
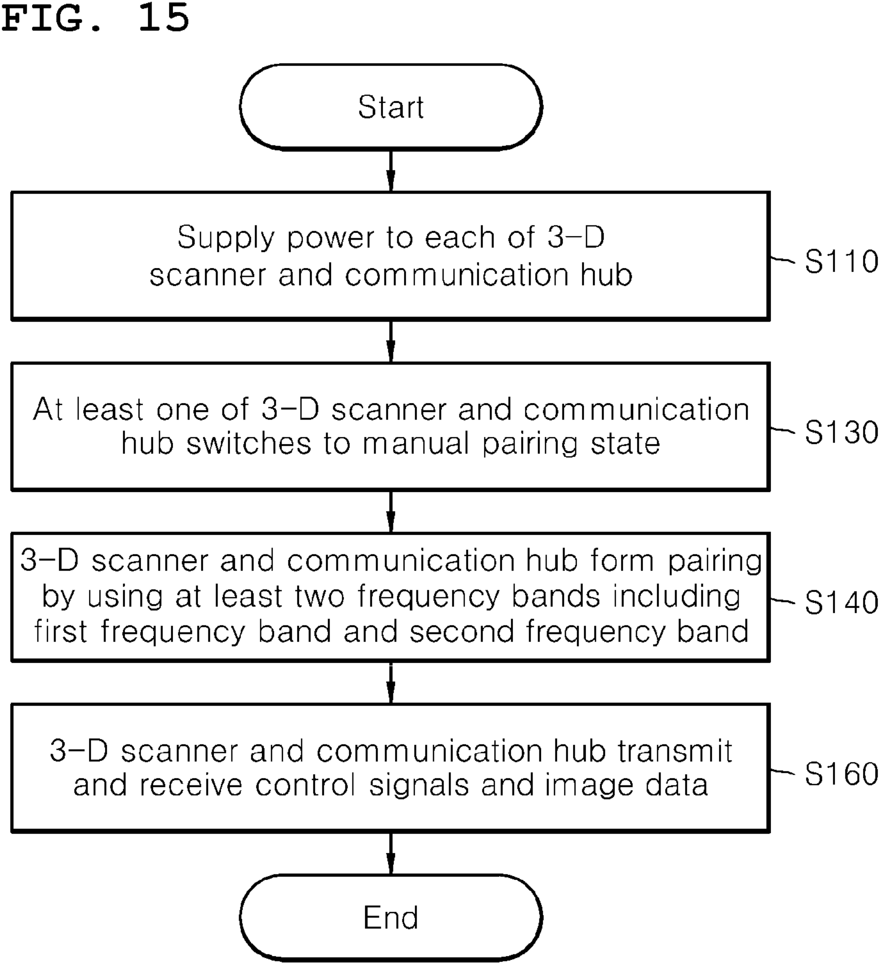
FIG. 15 is a flowchart illustrating a pairing method for the wireless scanning system according to the present disclosure.

FIG. 15 is a flowchart illustrating a pairing method for the wireless scanning system according to the present disclosure.

Referring to FIG. 15, the pairing method for the wireless scanning system according to a disclosed embodiment of the present disclosure includes a manual pairing standby step S130 and a pairing step S140.

The wireless scanning system that has been described with reference to FIGS. 1 to 14 generally may include the 3-D scanner and the communication hub, and requires the pairing of the 3-D scanner and the communication hub in order to enable wireless communication between the 3-D scanner and the external electronic device.

In order to form pairing between the 3-D scanner and the communication hub, first, a power supply step S110 of supplying power to each of the 3-D scanner and the communication hub may be performed.

Illustratively, the power supply step S110 may mean a process of a user of the wireless scanning system according to a disclosed embodiment of the present disclosure changing the state of each of the 3-D scanner and the communication hub into an ON state. As another example, the power supply step S110 may mean a process in which when any one of the 3-D scanner and the communication hub switches to the ON state, the state of the other of the 3-D scanner and the communication hub is changed so that power is supplied thereto by transmitting a control signal for supplying the power to the other of the 3-D scanner and the communication hub.

In the manual pairing standby step S130, at least one of the 3-D scanner and the communication hub may switch to the manual pairing state. Illustratively, the manual pairing standby step S130 may mean that the scanner-side processor of the 3-D scanner controls at least one of the scanner-side first communication module and the scanner-side second communication module so that at least one of the scanner-side first communication module and the scanner-side second communication module switches to the manual pairing state. As another example, the manual pairing standby step S130 may mean that the communication hub-side processor of the communication hub controls at least one of the communication hub-side first communication module and the communication hub-side second communication module so that at least one of the communication hub-side first communication module and the communication hub-side second communication module switches to the manual pairing state.

In this case, at least one of the 3-D scanner and the communication hub may automatically switch to the manual pairing state when power is supplied in the power supply step S110. That is, the manual pairing standby step S130 may be automatically performed when power is supplied to each of the 3-D scanner and the communication hub. If the manual pairing standby step S130 is automatically performed when power is supplied to each of the 3-D scanner and the communication hub, there is an advantage in that pairing between devices to be used by a user can be automatically performed although the user does not perform a separate operation.

When at least one of the 3-D scanner and the communication hub switches to the manual pairing state, the pairing step S140 may be performed. The pairing step S140 may be a process of the 3-D scanner and the communication hub forming pairing for wireless communication between the 3-D scanner and the external electronic device.

Illustratively, in the pairing step S140, the 3-D scanner and the communication hub may form pairing by using at least two frequency bands including the first frequency band and the second frequency band different from the first frequency band. Illustratively, in the pairing step S140, the 3-D scanner and the communication hub may form the first pairing in the first frequency band and form the second pairing in the second frequency band.

When the pairing step S140 of the 3-D scanner and the communication hub forming pairing is performed, a data transmission step S160 of control signals and image data being transmitted and received between the 3-D scanner and the communication hub may be performed. When stable pairing between the 3-D scanner and the communication hub is formed, the external electronic device may transmit a control signal for controlling the 3-D scanner through the communication hub. The 3-D scanner may transmit, to the external electronic device, image data that have been obtained by scanning the object through the communication hub.

Figure 16:
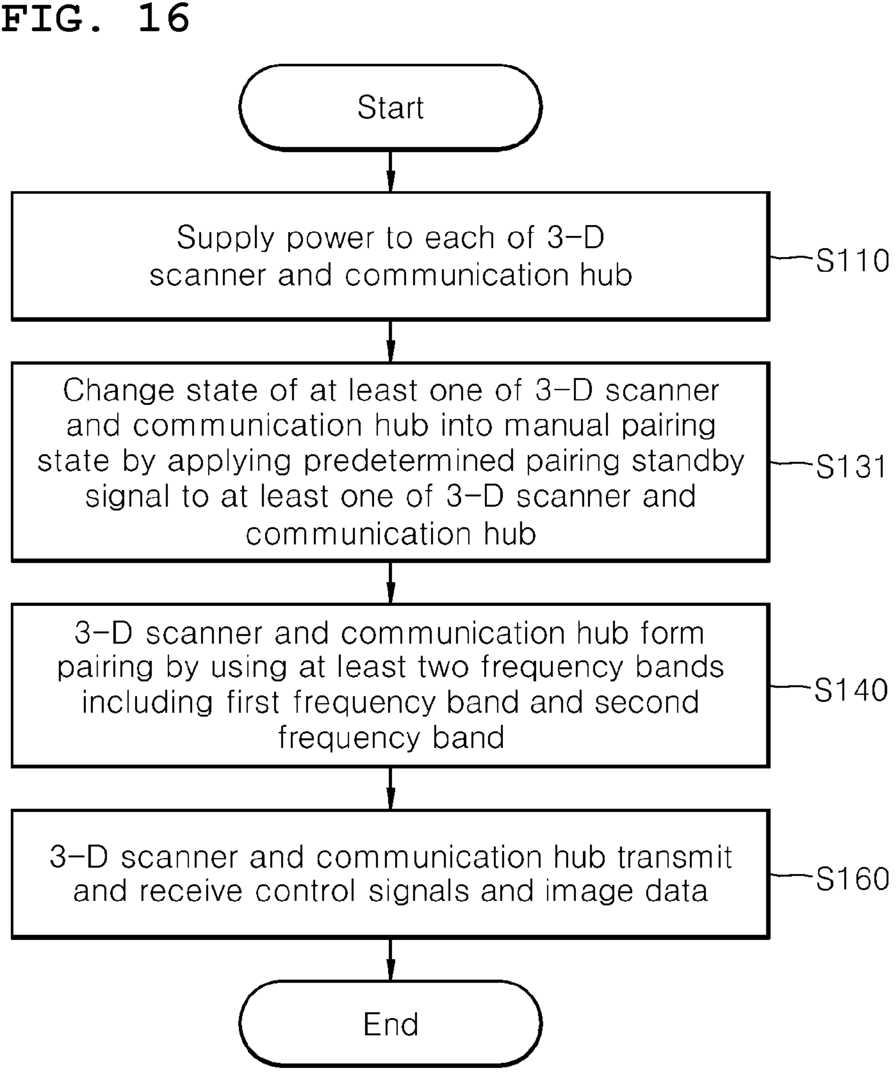
FIG. 16 is another flowchart illustrating a pairing method for the wireless scanning system according to the present disclosure.

FIG. 16 is another flowchart illustrating a pairing method for the wireless scanning system according to the present disclosure.

Referring to FIG. 16, a manual pairing standby step S131 that is slightly different from the manual pairing standby step S130 described with reference to FIG. 15 may be performed. As illustrated in FIG. 16, the manual pairing standby step S131 may be performed when a predetermined pairing standby signal is applied to at least one of the 3-D scanner and the communication hub after power is supplied to each of the 3-D scanner and the communication hub through the power supply step S110.

Illustratively, the predetermined pairing standby signal may be generated by a user input through a user interface, such as a specific physical button or a touch pad. Illustratively, if a button has been formed on one surface of the 3-D scanner, a user may apply a pairing standby signal by long pressing the button once. That is, such an operation of a user may be a request that is made to the 3-D scanner so that manual pairing between the 3-D scanner and the communication hub is performed. Accordingly, the scanner-side processor may perform the manual pairing standby step S131. At least one of the scanner-side first communication module and the scanner-side second communication module may change into the manual pairing state.

Hereinafter, a pairing data check step S120 which may be performed prior to the manual pairing standby step S130 and a pairing step S140 that is differently performed based on the results of the check of the pairing data check step S120 are described.

Figure 17:
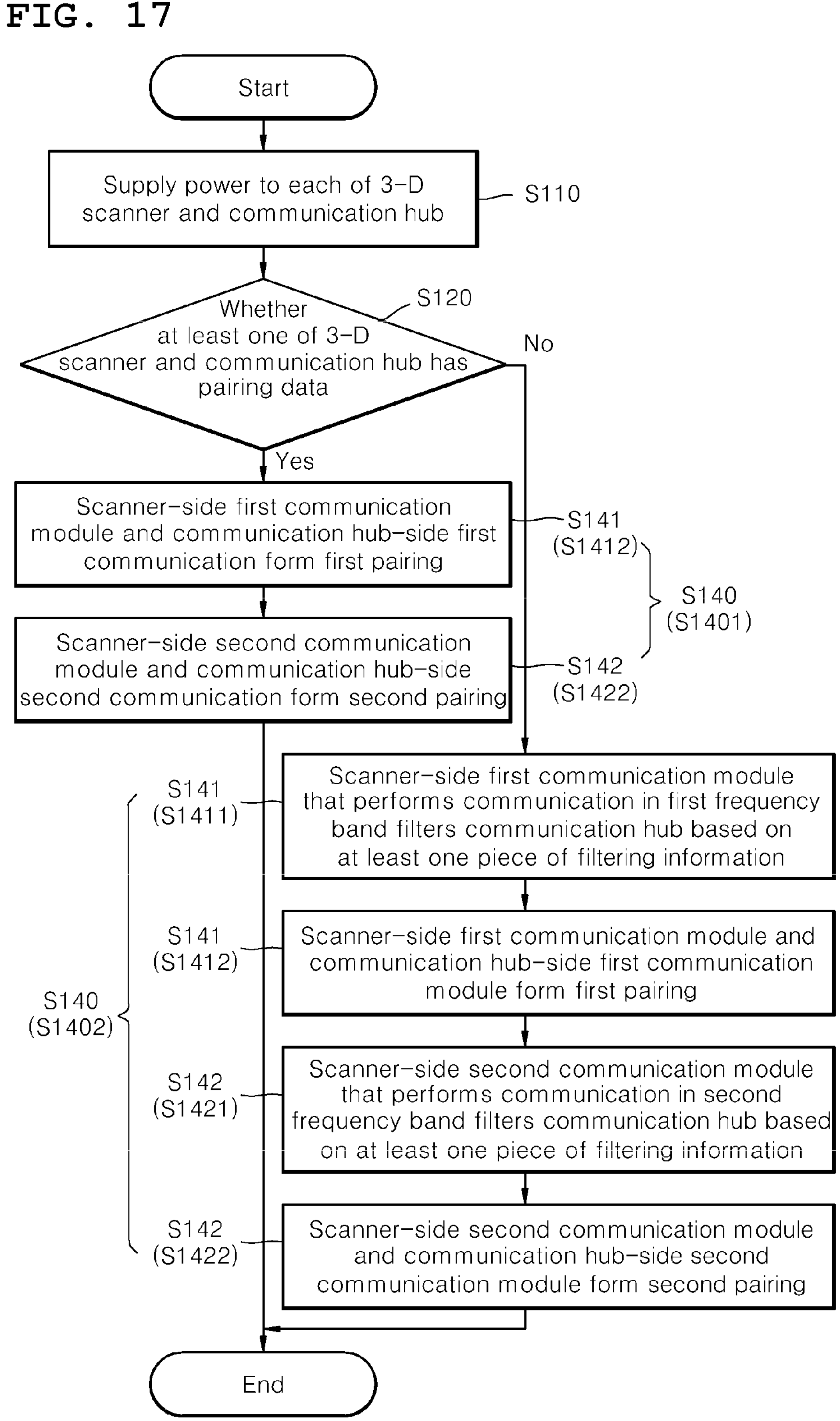
FIG. 17 is another flowchart illustrating a pairing method for the wireless scanning system according to the present disclosure.

FIG. 17 is another flowchart illustrating a pairing method for the wireless scanning system according to the present disclosure.

The pairing method for the wireless scanning system according to a disclosed embodiment of the present disclosure may further include the pairing data check step S120. The pairing data check step S120 may be performed prior to the manual pairing standby S130, S131. Illustratively, in the pairing data check step S120, pairing data of at least one of the 3-D scanner and the communication hub may be checked. For example, in the pairing data check step S120, the scanner-side processor of the 3-D scanner may check pairing data that have been stored in the scanner-side storage unit. When the stored pairing data are present, the pairing step S140, S1401 may be performed based on the pairing data.

The pairing step S140, S1401 that is performed when the stored pairing data are present may be a step of automatically forming, by the 3-D scanner and the communication hub corresponding to the pairing data, pairing. The time that is taken for devices that have previously formed pairing to form the pairing again can be reduced because the 3-D scanner and the communication hub automatically form the pairing when the stored pairing data are present.

As another example, in the pairing data check step S120, the scanner-side processor of the 3-D scanner may check pairing data that have been stored in the scanner-side storage unit. When stored pairing data are not present, another pairing step S140, S1402 may be performed. The pairing step S140, S1402 that is performed when stored pairing data are not present may be a step of the 3-D scanner and the communication hub newly forming pairing.

Hereinafter, the pairing step S140 is described in detail.

First, the pairing step S140 includes a first pairing step S141 and a second pairing step S142. More specifically, in the first pairing step S141, at least one of the 3-D scanner and the communication hub may form the first pairing between the 3-D scanner and the communication hub through communication in the first frequency band. Illustratively, the scanner-side first communication module and the communication hub-side first communication module may form the first pairing over the first communication network that uses the first frequency band of 2.4 GHz or 5 GHz. Control signals may be mutually transmitted and received bidirectionally by the first pairing.

In the second pairing step S142, at least one of the 3-D scanner and the communication hub may form the second pairing between the 3-D scanner and the communication hub through communication in the second frequency band different from the first frequency band. Illustratively, the scanner-side second communication module and the communication hub-side second communication module may form the second pairing over the second communication network that uses the second frequency band of 60 GHz. Image data may be transmitted and received unidirectionally (or bidirectionally) by the second pairing.

The first frequency band that is used by the first communication network may be formed to be lower than the second frequency band that is used by the second communication network. The communication distance of the first frequency band may be formed to be longer than the communication distance of the second frequency band. Accordingly, due to such characteristics of the first frequency band and the second frequency band, the second pairing step S142 may be performed after the first pairing is formed (i.e., after the first pairing step S141 is performed).

Hereinafter, a pairing step S1402 that is performed when pairing data are not present is described. In the pairing step S1402 that is performed when pairing data are not present, the first pairing step S141 may include a first filtering step S1411 and a first pairing forming step S1412. The first filtering step S1411 may mean that the 3-D scanner distinguishes a communication hub with which the first pairing will be formed from another device.

More specifically, in the first filtering step S1411, by the scanner-side processor embedded in the 3-D scanner, the scanner-side first communication module that performs communication in the first frequency band may filter a communication hub based on at least one piece of filtering information. The filtering information may include a service universal unique identifier (UUID) unique to a communication hub and a device name of the communication hub. The scanner-side first communication module may filter (distinguish) a communication hub from other devices based on the filtering information. Pairing between other devices, which are present in a space in which a user uses the 3-D scanner, and the 3-D scanner can be prevented.

After the first filtering step S1411 is performed, in the first pairing forming step S1412, the scanner-side first communication module and the communication hub-side first communication module may form the first pairing in the first frequency band. As the scanner-side first communication module and the communication hub-side first communication module form the first pairing in the first frequency band, the 3-D scanner and the external electronic device may mutually transmit and receive predetermined signals (e.g., control signals). The control signal may include at least one of a control signal related to at least one of an acquisition operation and transmission operation of image data, a control signal to limit an acquisition operation of image data, and a control signal to limit a transmission operation of image data.

In the pairing step S1402 that is performed when pairing data are not present, the second pairing step S142 may include a second filtering step S1421 and a second pairing forming step S1422. The second filtering step S1421 may mean that the 3-D scanner distinguishes a communication hub with which the second pairing will be formed from another device.

More specifically, in the second filtering step S1421, by the scanner-side processor embedded in the 3-D scanner, the scanner-side second communication module that performs communication in the second frequency band may filter a communication hub based on at least one piece of filtering information. The filtering information may include a service universal unique identifier (UUID) unique to a communication hub and a device name of the communication hub. The scanner-side second communication module may filter (distinguish) a communication hub from other devices based on the filtering information. Pairing between other devices, which are present in a space in which a user uses the 3-D scanner, and the 3-D scanner can be prevented.

However, the second filtering step S1421 for the second pairing may be performed faster than the first filtering step S1411 because the 3-D scanner and the communication hub form the first pairing.

After the second filtering step S1421 is performed, in the second pairing forming step S1422, the scanner-side second communication module and the communication hub-side second communication module may form the second pairing in the second frequency band. As the scanner-side second communication module and the communication hub-side second communication module form the second pairing in the second frequency band, the 3-D scanner may transmit, to the external electronic device, image data that have been obtained through a scan process of the 3-D scanner. The image data may include at least one of 2-D frames, HDMI-encoded HDMI data, and 3-D data.

The pairing step S1401 that is performed when pairing data are present does not require separate filtering steps S1411 and S1421. That is, the first filtering step S1411 and the second filtering step S1421 may be performed when the 3-D scanner and the communication hub do not have pairing data prior to the manual pairing standby step S130, S131. Illustratively, the first pairing step S141 of the pairing step S1401 that is performed when pairing data are present may include the first pairing forming step S1412, and the second pairing step S142 thereof may include the second pairing forming step S1422.

When pairing data are present because devices that have already been paired are present, an unnecessary filtering step can be omitted. The 3-D scanner and the communication hub between which pairing was performed in the past can rapidly form the first pairing and the second pairing, and can mutually transmit and receive control signals and image data stably.

Hereinafter, a process of limiting an operation of the 3-D scanner when any one of the first pairing and the second pairing between the 3-D scanner and the communication hub fails is described.

Figure 18:
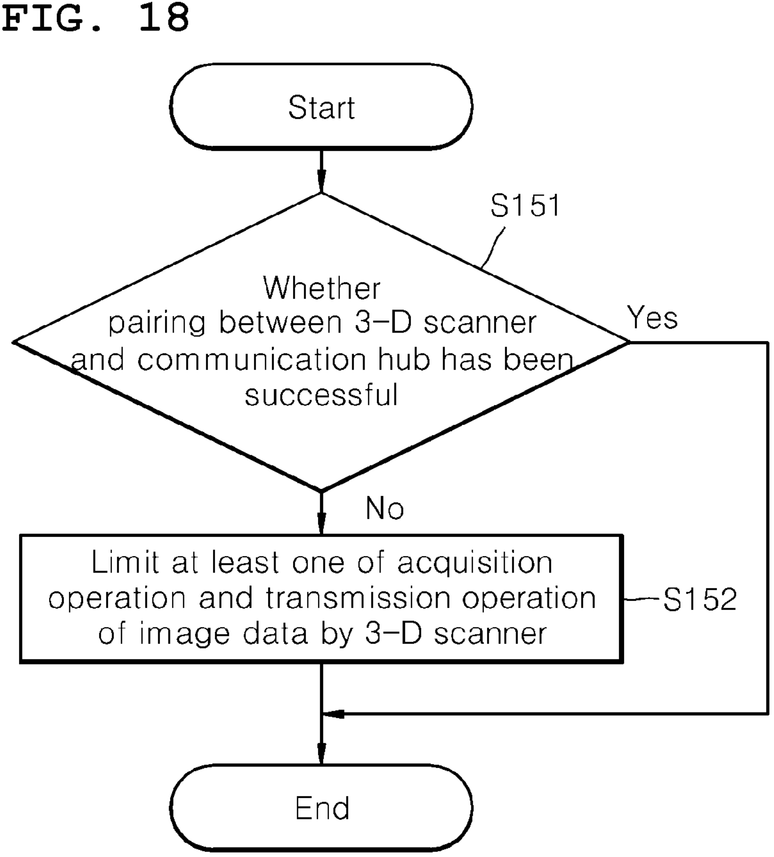
FIG. 18 is another flowchart illustrating a pairing method for the wireless scanning system according to the present disclosure.

FIG. 18 is another flowchart illustrating a pairing method for the wireless scanning system according to the present disclosure.

Referring to FIG. 18, the pairing method for the wireless scanning system according to a disclosed embodiment of the present disclosure may include a 3-D scanner limit step S150. The 3-D scanner limit step S150 includes step S151 of checking whether pairing is successful. In step S151 of checking whether pairing is successful, at least one of the scanner-side processor, the communication hub-side processor, and the processor of the external electronic device may check whether pairing between the 3-D scanner and the communication hub has been successful. In this case, when any one of the first pairing and the second pairing between the 3-D scanner and the communication hub fails, a 3-D scanner control step S152 may be performed.

In the 3-D scanner control step S152, any one of the communication hub-side processor and the processor of the external electronic device may limit at least one of an acquisition operation and transmission operation of image data by the 3-D scanner by applying a control signal to the 3-D scanner.

Illustratively, in the 3-D scanner control step S152, the communication hub-side processor may limit operations of the first type light source and the camera module belonging to the optical unit of the 3-D scanner by transmitting a control signal to limit an acquisition operation of image data by the 3-D scanner through the communication hub-side first communication module and the scanner-side first communication module.

As another example, in the 3-D scanner control step S152, the communication hub-side processor may transmit a control signal to limit a transmission operation of image data by the 3-D scanner through the communication hub-side first communication module and the scanner-side first communication module so that the image data obtained by the 3-D scanner are stored in the scanner-side storage unit and are not transmitted through the scanner-side first communication module.

According to such a 3-D scanner limit step S150, when any one of the first pairing and the second pairing between the 3-D scanner and the communication hub fails, the acquisition or transmission of image data is limited. Accordingly, there are advantages in that a data loss which may occur due to the transmission of image data in the first frequency band can be prevented and the waste of resources according to the acquisition of unnecessary image data can be prevented.

Furthermore, the pairing method for the wireless scanning system according to various embodiments of the present disclosure may be implemented in the form of a program instruction which may be executed by various computer means, and may be stored in a computer-readable medium. Furthermore, an embodiment of the present disclosure may be a computer-readable recording medium on which one or more programs including commands that execute a data transmission method of the intraoral scanner have been recorded.

The computer-readable medium may include a program instruction, a data file, and a data structure solely or in combination. The program instruction recorded on the medium may be specially designed and constructed for the present disclosure, or may be known and available to those skilled in the computer software field. Examples of the computer-readable recording medium include magnetic media such as a hard disk, a floppy disk, and a magnetic tape, optical media such as CD-ROM and a DVD, magneto-optical media such as a floptical disk, and a hardware device specially configured to store and execute a program instruction, such as ROM, RAM, and flash memory. Examples of the program instruction include a high-level language code executable by a computer by using an interpreter in addition to a machine-language code, such as that written by a compiler.

In this case, the storage medium readable by a device may be provided in the form of a non-transitory storage medium. In this case, the term "non-transitory" merely means that the storage medium is a tangible device and does not include a signal (e.g., electromagnetic waves). The term does not distinguish between a case where data is semi-permanently stored in the storage medium and a case where data is temporally stored in the storage medium. For example, the "non-transitory storage medium" may include a buffer in which data are temporarily stored.

According to an embodiment, the pairing method for the wireless scanning system according to various embodiments disclosed in this document may be included in a computer program product and provided therethrough. The computer program product may be traded as a product between a seller and a purchaser. The computer program product may be distributed in the form of a device-readable storage medium (e.g., compact disc read only memory (CD-ROM)) or may be distributed (e.g., downloaded or uploaded) through an application store (e.g., PlayStore™) or directly between two user devices (e.g., smartphones) online. If the computer program product is distributed online, at least some of the computer program product (e.g., a downloadable app) may be at least temporarily stored or temporarily generated in a device-readable storage medium, such as a memory included in the server of a manufacturer, the server of an application store, or a relay server.

Specifically, the pairing method for the wireless scanning system disclosed according to the various embodiments may be implemented in the form of a computer program product, including a recording medium in which a program that enables an operation of obtaining a sentence composed of multiple languages and an operation of obtaining vector values corresponding to respective words included in the sentence composed of the multiple languages by using a multi-language translation model, converting the obtained vector values into vector values corresponding to a target language, and obtaining a sentence composed of the target language based on the converted vector values to be performed has been stored.

The above description is merely a description of the technical spirit of the present disclosure, and a person having ordinary knowledge in the field to which the present disclosure pertains may change and modify the present disclosure in various ways without departing from the essential characteristic of the present disclosure.

Accordingly, the embodiments disclosed in the present disclosure should not be construed as limiting the technical spirit of the present disclosure, but should be construed as describing the technical spirit of the present disclosure. The range of the technical spirit of the present disclosure is not restricted by the embodiments. The range of protection of the present disclosure should be construed based on the following claims, and all of technical spirits within an equivalent range of the present disclosure should be construed as being included in the scope of rights of the present disclosure.

INDUSTRIAL APPLICABILITY

The present disclosure provides the wireless scanning system and the pairing method for the wireless scanning system, which enable the stable and smooth transmission and reception of control signals and image data between the 3-D scanner and the external electronic device by performing pairing in at least two different frequency bands, by controlling the scanner-side communication unit in the manual pairing state.

The invention claimed is:

1. A wireless scanning system comprising a three-dimensional (3-D) scanner configured to obtain at least one image data by scanning an object and mutually connected to an external electronic device by forming pairing with a communication hub, wherein the 3-D scanner comprises:

a scanner-side processor configured to perform at least one piece of control; and a scanner-side communication unit comprising a scanner-side first communication module configured to perform pairing in a first frequency band and a scanner-side second communication module configured to perform pairing in a second frequency band different from the first frequency band, wherein the 3-D scanner and the communication hub mutually transmit and receive control signals related to at least one of an acquisition operation and transmission operation of the image data in the first frequency band, and mutually transmit and receive or unidirectionally transmit the image data in the second frequency band.

2. The wireless scanning system of claim 1, wherein the scanner-side processor controls at least one of the scanner-side first communication module and the scanner-side second communication module in a manual pairing state.

3. The wireless scanning system of claim 1, wherein:

the first frequency band is formed to be lower than the second frequency band, and a communication distance of the first frequency band is formed to be greater than a communication distance of the second frequency band.

4. The wireless scanning system of claim 1, wherein:

the communication hub comprises a communication hub-side communication unit comprising a communication hub-side first communication module configured to perform communication with the 3-D scanner in the first frequency band and a communication hub-side second communication module configured to perform communication with the 3-D scanner in the second frequency band, and the scanner-side processor controls the scanner-side first communication module in a pairing state, so that the scanner-side first communication module filters the communication hub based on at least one piece of filtering information, and the scanner-side first communication module and the communication hub-side first communication module form first pairing.

5. The wireless scanning system of claim 4, wherein:

the scanner-side processor controls the scanner-side second communication module in the pairing state, so that the scanner-side second communication module filters the communication hub based on at least one piece of filtering information, and the scanner-side second communication module and the communication hub-side second communication module form second pairing, and the second pairing is formed after the first pairing.

6. The wireless scanning system of claim 5, wherein when any one of the first pairing and the second pairing fails, the external electronic device transmits, to the scanner-side processor, a control signal to limit the acquisition operation of the image data by the 3-D scanner through the communication hub.

7. The wireless scanning system of claim 6, wherein:

the 3-D scanner further comprises an optical unit comprising a projector configured to project predetermined light toward the object and a camera module configured to obtain the image data, and an operation of at least some of the optical unit is limited by the control signal to limit the acquisition operation of the image data.

8. The wireless scanning system of claim 7, wherein:

the projector comprises a first type light source for obtaining a color and shape of the image data and a second type light source for sterilizing an inside of the 3-D scanner, and an operation of the first type light source is limited by the control signal to limit the acquisition operation of the image data.

9. The wireless scanning system of claim 5, wherein when any one of the first pairing and the second pairing fails, the external electronic device transmits, to the scanner-side processor, a control signal to limit a transmission operation of the image data by the 3-D scanner through the communication hub.

10. The wireless scanning system of claim 1, wherein:

the 3-D scanner and the communication hub mutually transmit and receive the control signals bidirectionally, and the 3-D scanner unidirectionally transmits the image data to the communication hub in response to a control signal related to the transmission operation.

11. A pairing method for a wireless scanning system, comprising:

a manual pairing standby step of at least one of a three-dimensional (3-D) scanner and a communication hub switching to a manual pairing state; and a pairing step of the 3-D scanner and the communication hub forming pairing by using at least two frequency bands comprising a first frequency band and a second frequency band different from the first frequency band, wherein the 3-D scanner and the communication hub mutually transmit and receive control signals related to at least one of an acquisition operation and transmission operation of at least one image data in the first frequency band, and mutually transmit and receive or unidirectionally transmit the image data in the second frequency band.

12. The pairing method of claim 11, wherein the manual pairing standby step is performed when power is supplied to each of the 3-D scanner and the communication hub and a predetermined pairing standby signal is applied to at least one of the 3-D scanner and the communication hub.

13. The pairing method of claim 11, further comprising a pairing data check step of checking pairing data of at least one of the 3-D scanner and the communication hub prior to the manual pairing standby step, wherein when the pairing data are present in the pairing data check step, the 3-D scanner and the communication hub corresponding to the pairing data are automatically paired.

14. The pairing method of claim 11, wherein the pairing step comprises:

a first pairing step of at least one of the 3-D scanner and the communication hub forming first pairing between the 3-D scanner and the communication hub through communication in a first frequency band; and a second pairing step of at least one of the 3-D scanner and the communication hub forming second pairing between the 3-D scanner and the communication hub through communication in a second frequency band different from the first frequency band, wherein the second pairing step is performed after the first pairing is formed.

15. The pairing method of claim 14, wherein the first pairing step comprises:

a first filtering step of a scanner-side first communication module that performs communication in the first frequency band filtering the communication hub based on at least one piece of filtering information by a scanner-side processor embedded in the 3-D scanner; and a first pairing forming step of the scanner-side first communication module and a communication hub-side first communication module forming the first pairing.

16. The pairing method of claim 15, wherein the second pairing step comprises:

a second filtering step of a scanner-side second communication module that performs communication in the second frequency band filtering the communication hub based on at least one piece of filtering information by the scanner-side processor embedded in the 3-D scanner; and a second pairing forming step of the scanner-side second communication module and a communication hub-side second communication module forming the second pairing.

17. The pairing method of claim 16, wherein the first filtering step and the second filtering step are performed when the 3-D scanner and the communication hub do not have pairing data prior to the manual pairing standby step.

18. The pairing method of claim 14, wherein:

the first frequency band is formed to be lower than the second frequency band, and a communication distance of the first frequency band is formed to be greater than a communication distance of the second frequency band.

19. The pairing method of claim 14, further comprising a 3-D scanner limit step of the communication hub limiting at least one of an acquisition operation and transmission operation of image data by the 3-D scanner by applying a control signal to the 3-D scanner when any one of the first pairing and the second pairing fails.

* * * * *